(12) United States Patent
Naseri et al.

(10) Patent No.: US 10,125,646 B2
(45) Date of Patent: Nov. 13, 2018

(54) EXHAUST SYSTEM FOR A DIESEL ENGINE

(71) Applicant: Johnson Matthey Public Limited Company, London (GB)

(72) Inventors: Mojghan Naseri, Audubon, PA (US); Ceren Aydin, Audubon, PA (US); Shadab Mulla, Audubon, PA (US); Raymond Conway, Audubon, PA (US)

(73) Assignee: Johnson Matthey Public Limited Company, London (GB)

(*) Notice: Subject to any disclaimer, the term of this patent is extended or adjusted under 35 U.S.C. 154(b) by 63 days.

(21) Appl. No.: 15/097,611

(22) Filed: Apr. 13, 2016

(65) Prior Publication Data
US 2017/0298796 A1 Oct. 19, 2017

(51) Int. Cl.
*F01N 13/00* (2010.01)
*F01N 13/16* (2010.01)
(Continued)

(52) U.S. Cl.
CPC .......... *F01N 3/2066* (2013.01); *F01N 3/035* (2013.01); *F01N 3/103* (2013.01); *F01N 13/009* (2014.06);
(Continued)

(58) Field of Classification Search
CPC ........ F01N 13/011; F01N 13/16; F01N 3/035; F01N 3/103; F01N 3/2066;
(Continued)

(56) References Cited

U.S. PATENT DOCUMENTS 6,599,570 B1 7/2003 Aderhold et al.
7,264,785 B2 9/2007 Blakeman et al.
(Continued)

FOREIGN PATENT DOCUMENTS

DE 10243270 A1 3/2004
EP 1458960 A2 8/2014
(Continued)

OTHER PUBLICATIONS

Rouquerol, et al.; Recommendations for the Characterization of Porous Solids; Pure & Appl. Chem., vol. 66, No. 8, pp. 1739-1758, 1994; Printed in Great Britain.
(Continued)

*Primary Examiner* — Brandon Lee

(57) ABSTRACT

An exhaust system for treating an exhaust gas produced by a diesel engine comprises: (a) an emissions control device (ECD) for oxidizing carbon monoxide (CO) and/or hydrocarbons (HCs), wherein the emissions control device comprises a platinum group metal (PGM) and a substrate, wherein the PGM is platinum, palladium or a combination thereof; (b) an injector for introducing an ammonia precursor into the exhaust gas, which is downstream of the ECD; (c) a first selective catalytic reduction (SCR) catalyst downstream of the injector, wherein the first SCR catalyst comprises a substrate and a first SCR composition, wherein the substrate is either a flow-through substrate or a filtering substrate; (d) a second SCR catalyst downstream of the first SCR catalyst, wherein the second SCR catalyst comprises a flow-through substrate and a second SCR composition; and wherein at least one of the ECD and the first SCR reduction catalyst has a filtering substrate.

17 Claims, 6 Drawing Sheets

(51) Int. Cl.
  *F01N 3/035* (2006.01)
  *F01N 3/10* (2006.01)
  *F01N 3/20* (2006.01)
(52) U.S. Cl.
  CPC ......... *F01N 13/0093* (2014.06); *F01N 13/16* (2013.01); *F01N 2610/02* (2013.01); *F01N 2610/1453* (2013.01); *Y02T 10/24* (2013.01)
(58) Field of Classification Search
  CPC ......... F01N 2610/02; F01N 2610/1453; F01N 13/009; F01N 13/0093; Y02T 10/24
  See application file for complete search history.

(56) References Cited

U.S. PATENT DOCUMENTS

| | | | |
|---|---|---|---|
| 8,568,674 B1 * | 10/2013 | Sung | B01J 37/0244 423/213.2 |
| 8,652,429 B2 | 2/2014 | Sumiya et al. | |
| 8,667,785 B2 | 3/2014 | Blakeman et al. | |
| 8,668,891 B2 | 3/2014 | Blakeman et al. | |
| 8,703,236 B2 | 4/2014 | Chandler et al. | |
| 9,138,735 B2 | 9/2015 | Roberts et al. | |
| 9,259,684 B2 | 2/2016 | Blakeman et al. | |
| 2006/0196169 A1 | 9/2006 | Ripper et al. | |
| 2011/0000194 A1 * | 1/2011 | Gonze | F01N 3/027 60/286 |
| 2011/0113759 A1 * | 5/2011 | Tilinski | F01N 3/2066 60/295 |
| 2012/0308439 A1 | 12/2012 | Chen et al. | |
| 2014/0223902 A1 | 8/2014 | Yacoub | |
| 2014/0366509 A1 * | 12/2014 | Hirth | F01N 3/2013 60/274 |

FOREIGN PATENT DOCUMENTS

| | | | | |
|---|---|---|---|---|
| EP | 2882523 | A2 | 6/2015 | |
| WO | 199947260 | A1 | 9/1999 | |
| WO | 2011080525 | A1 | 7/2011 | |
| WO | 2012166868 | A1 | 12/2012 | |
| WO | 2013050784 | A2 | 4/2013 | |
| WO | 2013088128 | A1 | 6/2013 | |
| WO | 2013088132 | A1 | 6/2013 | |
| WO | 2013088133 | A1 | 6/2013 | |
| WO | WO 2014170711 | A1 * | 10/2014 | ........... F01N 3/2066 |
| WO | 2014195685 | A1 | 12/2014 | |
| WO | 2015145122 | A2 | 10/2015 | |
| WO | 2016128720 | A1 | 8/2016 | |

OTHER PUBLICATIONS

Lee et al.; SAE 2008-01-0072; Evaluation of Cu-Based SCR/DPF Technology for Diesel Exhaust Emission Control; SAE Int. J. Fuels Lubr. vol. 1, Issue 1.

Naseri et al.; SAE 2011-01-1312; Development of SCR on Diesel Particulate Filter System for Heavy Duty Applications; SAE Int. J. Engines vol. 4 Issue 1.

Kawakami et al.; High Porosity DPF Design for Integrated SCR Functions; SAE 2012-01-0843; Published Apr. 16, 2012.

Naseri et al.; SAE 2014-01-1525; Development of Emission Control Systems to Enable High NOx Conversion on Heavy Duty Diesel Engines; Published Apr. 1, 2014.

Naseri et al.; SAE 2015-01-0992; Development of Emission Control Systems to Enable High NOx Conversion on Heavy Duty Diesel Engines; Published Apr. 14, 2015.

* cited by examiner

EXHAUST SYSTEM FOR A DIESEL ENGINE

FIELD OF THE INVENTION

The invention relates to an exhaust system for a diesel engine. The invention also relates to a vehicle comprising the exhaust system and to a method of treating an exhaust gas produced by a diesel engine.

BACKGROUND TO THE INVENTION

Diesel engines produce an exhaust emission that generally contains at least four classes of pollutant that are legislated against by inter-governmental organisations throughout the world: carbon monoxide (CO), unburned hydrocarbons (HCs), oxides of nitrogen ($NO_x$) and particulate matter (PM). A variety of emissions control devices exist for treating one or more of each type of pollutant. These emissions control devices are often combined as part of an exhaust system to ensure that all four classes of pollutant are treated before emission of the exhaust gas into the environment.

Diesel engines, particularly heavy duty (HD) diesel engines, are being designed to have improved fuel economy. As a consequence of these designs, the diesel engines output higher levels of oxides of nitrogen ($NO_x$) and the exhaust systems for such engines are required to provide increasingly higher $NO_x$ conversion to meet emission regulations.

Selective catalytic reduction (SCR) has been demonstrated to be an effective solution for meeting $NO_x$ emission requirements and regulations for diesel engines, particularly HD diesel engines. With increasing demand for improved fuel economy, improving the $NO_x$ emission reduction of the SCR system would allow for higher engine out $NO_x$ emissions. However, such requirements are challenging for current exhaust system designs, which typically consist of a diesel oxidation catalyst (DOC), a catalyzed soot filter (CSF) and an SCR catalyst.

One approach is to replace the CSF with a diesel particulate filter (DPF) coated with an SCR catalytic composition while keeping the flow-through SCR catalyst downstream. An example of such an exhaust system is described in SAE 2014-01-1525. Selective catalytic reduction catalysts on a filter substrate have been shown to have high $NO_x$ conversion capabilities (see SAE 2008-01-0072, SAE 2011-01-1312 and SAE 2012-01-0843).

It is also desirable to minimise the amount of nitrous oxide ($N_2O$) in exhaust gas emissions. The US Environmental Protection Agency has stated that the impact of 1 pound of nitrous oxide ($N_2O$) in warming the atmosphere is over 300 times that of 1 pound of carbon dioxide ($CO_2$). Nitrous oxide ($N_2O$) is also an ozone-depleting substance (ODS). It has been estimated that nitrous oxide ($N_2O$) molecules stay in the atmosphere for about 120 years before being removed or destroyed. Current legislation for regulating engine emissions does not limit nitrous oxide ($N_2O$) because it is regulated separately as a greenhouse gas (GHG).

SUMMARY OF THE INVENTION

The invention relates to an exhaust system that is able to provide very high $NO_x$ conversion, particularly at low temperature (e.g. at "cold start"—when a diesel engine is started from cold). The exhaust system may also minimise the amount of $N_2O$ that is generated as a by-product during $NO_x$ reduction.

The invention provides an exhaust system for treating an exhaust gas produced by a diesel engine comprising:
(a) an emissions control device for oxidising carbon monoxide (CO) and/or hydrocarbons (HCs), wherein the emissions control device comprises a platinum group metal (PGM) and a substrate, wherein the platinum group metal (PGM) is selected from platinum (Pt), palladium (Pd) and a combination thereof;
(b) an injector for introducing an ammonia precursor into the exhaust gas, which is downstream of the emissions control device for oxidising carbon monoxide (CO) and/or hydrocarbons (HCs);
(c) a first selective catalytic reduction catalyst downstream of the injector for introducing an ammonia precursor into the exhaust gas, wherein the first selective catalytic reduction catalyst comprises a substrate and a first selective catalytic reduction composition, wherein the substrate is either a flow-through substrate or a filtering substrate;
(d) a second selective catalytic reduction catalyst downstream of the first selective catalytic reduction catalyst, wherein the second selective catalytic reduction catalyst comprises a flow-through substrate and a second selective catalytic reduction (SCR) composition; and
wherein at least one of the emissions control device and the first selective catalytic reduction catalyst has a filtering substrate.

The inventors have found that excellent $NO_x$ conversion can be obtained using the exhaust system of the invention. It has been found that the $NO_x$ conversion provided by the exhaust system can be further improved by (a) dosing $NH_3$ gas, especially at low temperatures, directly upstream of the first selective catalytic reduction catalyst and/or (b) heating the exhaust gas from the emissions control device for oxidising carbon monoxide (CO) and/or hydrocarbons (HCs), especially when the exhaust gas temperature is relatively low. The exhaust systems of the invention can provide >95% $NO_x$ conversion under transient FTP test cycles, which will allow diesel engines to meet future emission regulations and fuel economy targets.

The invention further provides a vehicle. The vehicle comprises a diesel engine and an exhaust system in accordance with the invention.

The invention also relates to a method of treating an exhaust gas produced by a diesel engine. The method comprises the steps of passing an exhaust gas produced by a diesel engine through an exhaust system, particularly an exhaust system in accordance with the invention.

BRIEF DESCRIPTION OF THE DRAWINGS

FIG. 1 shows an exhaust system where an exhaust gas (1) outlet from a turbocharger of a diesel engine flows into an oxidation catalyst (10), which can be diesel oxidation catalyst (DOC) or a cold start concept (dCSC™) catalyst. The exhaust gas (2) outlet from the oxidation catalyst flows through a conduit toward a first selective catalytic reduction catalyst, which is a selective catalytic reduction filter catalyst (40). A side flow $NH_3$ doser (20) is able to introduce gaseous $NH_3$ into the conduit. A conventional urea doser (25) is also located in the conduit. Both the side flow $NH_3$ doser (20) and the urea doser (25) are upstream of a mixer (30). The mixer is adjacent to the inlet face of the selective catalytic reduction filter catalyst (SCR-DPF) (40). A second selective catalytic reduction (SCR) catalyst (50). The SCR-DPF (40) and the SCR catalyst (50) are close-coupled and may be disposed within the same container (60). The exhaust gas from the outlet of the SCR catalyst (50) may then pass to an optional ammonia slip catalyst (70).

FIG. 2 shows the same exhaust system as shown in FIG. 1, except that the oxidation catalyst (10) in FIG. 1 has been replaced by a catalysed soot filter (80). The first SCR catalyst has a flow-through substrate.

FIG. 3 shows a similar exhaust system to the exhaust system in FIG. 2, except that an oxidation catalyst (10) is present in addition to the catalysed soot filter (80). The oxidation catalyst can be a diesel oxidation catalyst (DOC) or a cold start concept (dCSC™) catalyst.

FIG. 4 is a schematic diagram showing a side flow $NH_3$ doser arrangement. Exhaust gas from a diesel engine passes from an exhaust manifold (5) to a turbocharger (15) in the exhaust system. A by-pass (35) allows some of the exhaust gas (3) to pass into an arrangement for side flow $NH_3$ dosing. The arrangement may optionally contain a catalysed soot filter (45). The side flow $NH_3$ doser (20) contains a conventional urea doser (55) and a urea hydrolysis catalyst (65) for producing $NH_3$, which can be introduced into the main exhaust gas stream (1) from the turbocharger (15).

FIG. 5 shows a similar exhaust system to the exhaust system shown in FIG. 1. The oxidation catalyst (10) can be diesel oxidation catalyst (DOC), a catalysed soot filter (CSF), a cold start concept (dCSC™) catalyst or a combination of a diesel oxidation catalyst (DOC) and a catalysed soot filter (CSF). In addition or as an alternative to the side flow $NH_3$ doser (20), the exhaust system can contain an electrical heater (75), which can be used to the heat the exhaust gas that is outlet from the oxidation catalyst (10).

DETAILED DESCRIPTION OF THE INVENTION

Figure 1:
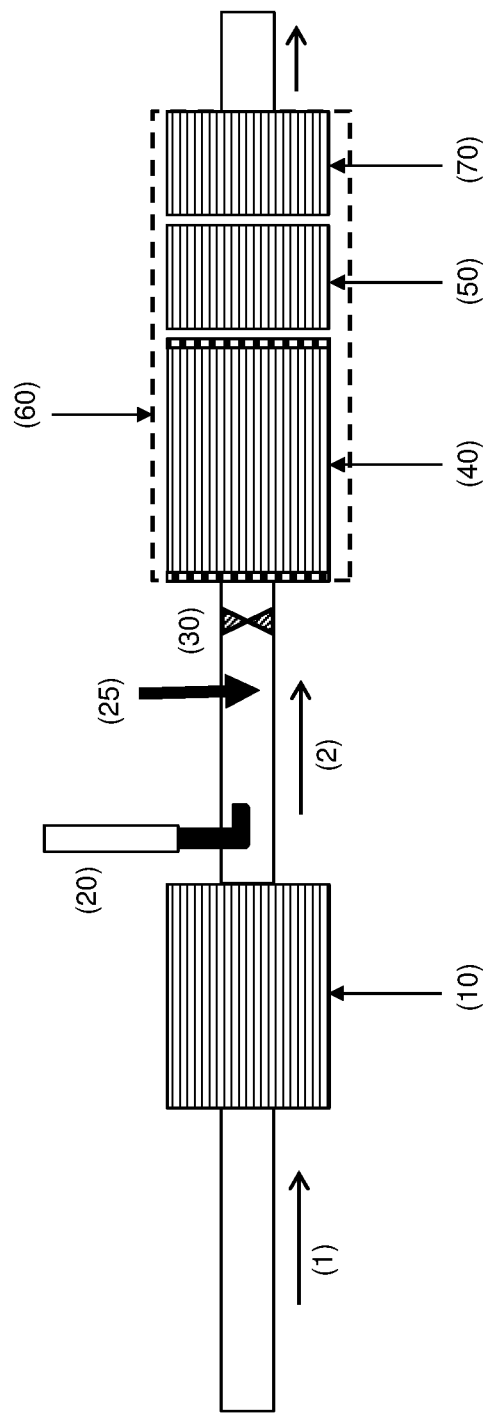
FIGS. 1 to 5 are schematic illustrations of aspects of an exhaust system in accordance with the invention.
Figure 2:
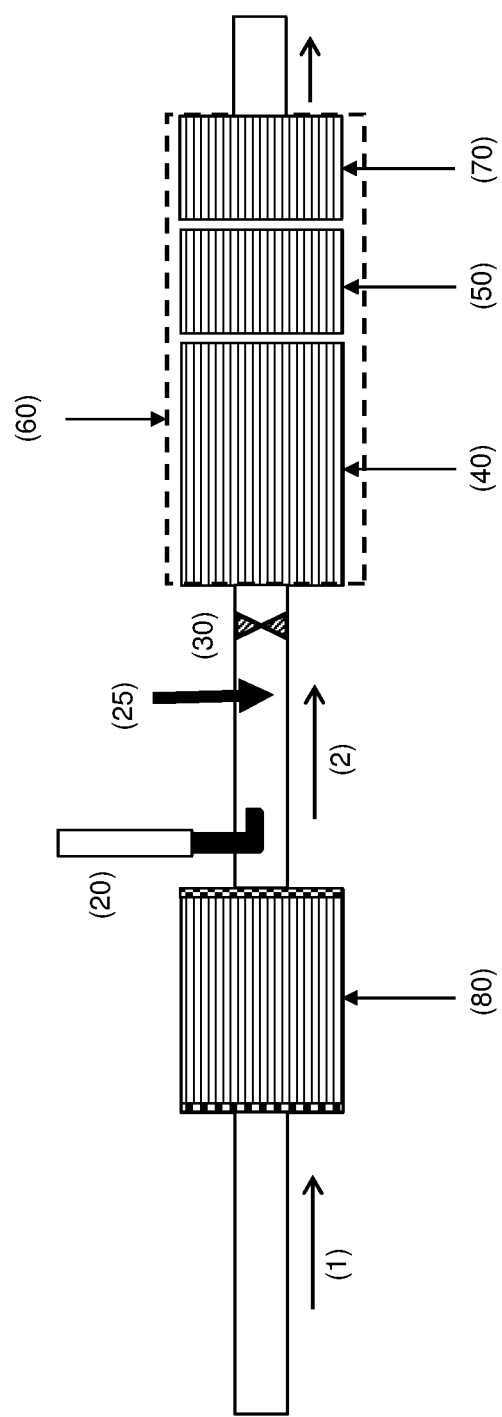
Figure 3:
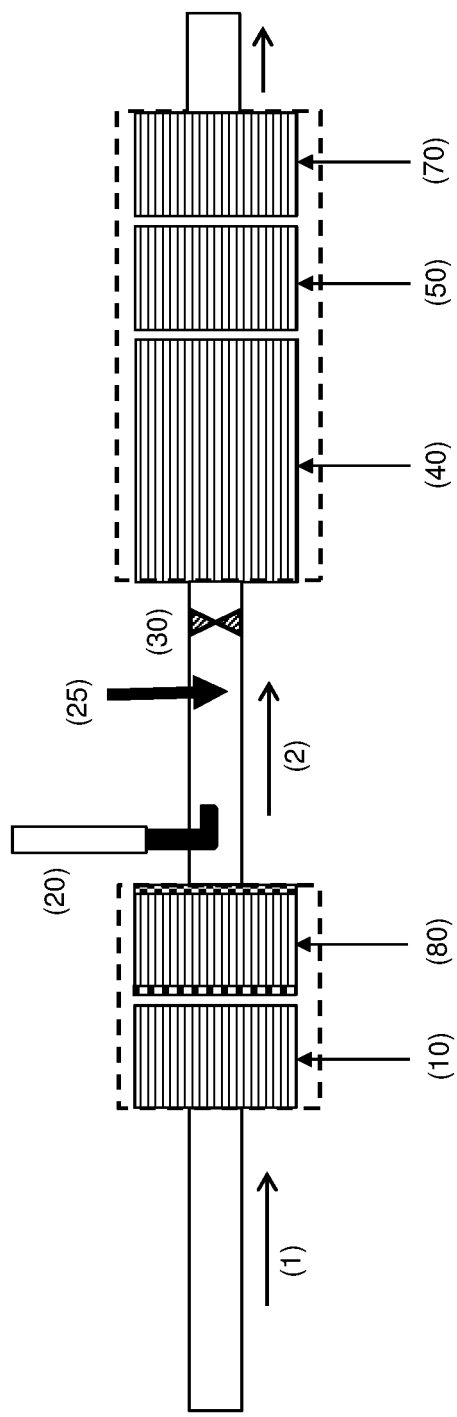

The present invention will now be further described. The following sections relate to different parts of the exhaust system and define each part in more detail, and also to the vehicle and method of the invention. Each part or aspect of invention so defined may be combined with any other part or aspect of the invention unless clearly indicated to the contrary. In particular, any feature indicated as being preferred or advantageous may be combined with any other feature or features indicated as being preferred or advantageous.

Emissions Control Device for Oxidising Carbon Monoxide (CO) and/or Hyhydrocarbons (HCs)

The emissions control device is suitable for oxidising carbon monoxide (CO) and/or hydrocarbons (HCs), preferably CO and HCs. The emissions control device may be further suitable for oxidising nitric oxide ($NO_x$) to nitrogen dioxide ($NO_2$).

The emissions control device for oxidising carbon monoxide (CO) and/or hydrocarbons (HCs) may be selected from the group consisting of:
(i) a diesel oxidation catalyst (DOC);
(ii) a catalysed soot filter (CSF);
(iii) a cold start concept (dCSC™) catalyst;
(iv) a diesel oxidation catalyst (DOC) and a catalysed soot filter (CSF); and
(v) a cold start concept (dCSC™) catalyst and a catalysed soot filter (CSF).

When the emissions control device is a diesel oxidation catalyst (DOC) and a catalysed soot filter (CSF), then preferably the DOC is upstream, preferably directly upstream, of the CSF. Thus, an outlet of the DOC is coupled (e.g. fluidly coupled by an exhaust gas conduit) to an inlet of the CSF.

When the emissions control device is a cold start concept (dCSC™) catalyst and a catalysed soot filter (CSF), then preferably the cold start concept catalyst is upstream, preferably directly upstream, of the CSF. Thus, an outlet of the cold start concept catalyst is coupled (e.g. fluidly coupled by an exhaust gas conduit) to an inlet of the CSF.

When the emissions control device is either (i) a diesel oxidation catalyst (DOC) and a catalysed soot filter (CSF) or (ii) a cold start concept (dCSC™) catalyst and a catalysed soot filter (CSF), then preferably the DOC and the CSF or the cold start concept catalyst and the CSF are close-coupled. This means that the distance between the outlet end of the diesel oxidation catalyst or the cold start concept catalyst and the inlet end of the catalysed soot filter is from 1.0 mm to 300 mm, preferably 3 mm to 200 mm, more preferably 5 mm to 150 mm (e.g. 8 mm to 100 mm), such as 10 mm to 80 mm (e.g. 12 mm to 70 mm), and even more preferably 15 mm to 50 mm. This is advantageous for thermal transfer and for space saving.

When the emissions control device is either (i) a catalysed soot filter (CSF), (ii) a cold start concept (dCSC™) catalyst having a filtering substrate, (iii) a diesel oxidation catalyst (DOC) and a catalysed soot filter (CSF) or (iv) a cold start concept (dCSC™) catalyst and a catalysed soot filter (CSF), then preferably the first selective catalytic reduction catalyst has a flow-through substrate.

When the emissions control device is either (i) a diesel oxidation catalyst (DOC) or (ii) a cold start concept (dCSC™) catalyst having a flow through substrate, then preferably the first selective catalytic reduction catalyst has a filtering substrate (i.e. the first SCR catalyst is a SCR-DPF).

Generally, it is preferable that the exhaust system of the invention comprises a single filtering substrate.

In general, the inlet of the emissions control device is coupled (e.g. fluidly coupled), preferably directly fluidly coupled to a turbocharger. Thus, the main exhaust gas stream pass from the diesel engine through a turbocharged to the emissions control device.

Typically, the diesel oxidation catalyst (DOC) and/or the catalysed soot filter (CSF) each comprise a catalytic composition disposed or supported on a substrate. The catalytic composition comprises the platinum group metal (PGM) selected from platinum (Pt), palladium (Pd) and a combination thereof.

When the emissions control device is a diesel oxidation catalyst and/or a catalysed soot filter, then the or each catalytic composition may independently further comprise at least one support material. The or each support material may independently comprise, or consist essentially of, a refractory oxide.

Typically, the or each refractory oxide is independently selected from the group consisting of alumina, silica, titania, zirconia, ceria and a mixed or composite oxide thereof, such as a mixed oxide or a composite oxide of two or more thereof. For example, the refractory oxide may be selected from the group consisting of alumina, silica, titania, zirconia, ceria, silica-alumina, titania-alumina, zirconia-alumina, ceria-alumina, titania-silica, zirconia-silica, zirconia-titania, ceria-zirconia and alumina-magnesium oxide. It is preferred that the or each refractory oxide is independently selected from the group consisting of alumina, silica, silica-alumina, ceria-alumina and ceria-zirconia. More preferably, the or each refractory oxide is independently selected from the group consisting of alumina and silica-alumina.

Each platinum group metal (PGM) is typically disposed or supported on a support material. The PGM may be disposed directly onto or is directly supported by the support material. For example, platinum and/or palladium can be dispersed on the support material.

When the emissions control device is a diesel oxidation catalyst and/or a catalysed soot filter, then the platinum group metal (PGM) of each catalytic composition is preferably selected from platinum (Pt) and a combination of platinum (Pt) and palladium (Pd). It is preferred that the platinum group metal (PGM) of each catalytic composition is a combination of platinum (Pt) and palladium (Pd).

When the platinum group metal (PGM) is a combination of platinum (Pt) and palladium (Pd), then there may be individual particles of platinum and palladium, which may be separated or mixed, or the platinum and palladium may be in the form of an alloy, preferably a bimetallic alloy.

In general, the diesel oxidation catalyst may have a total loading of platinum group metal of from 20 to 200 g ft$^{-3}$, preferably 25 to 175 g ft$^{-3}$, and more preferably 30 to 160 g ft$^{-3}$.

The catalysed soot filter may have a total loading of platinum group metal of from 0.5 to 10 g ft$^{-3}$, preferably 1 to 7.5 g ft$^{-3}$, and more preferably 4 to 6 g ft$^{-3}$.

The diesel oxidation catalyst and/or the catalysed soot filter may each independently comprise a ratio of the total mass of platinum to the total mass of the palladium of 5:1 to 1:5 (e.g. 3:1 to 1:3), such as 2:1 to 1:2. It is preferred that the total mass of platinum is greater than the total mass of palladium. Preferably, the ratio of the total mass of platinum to the total mass of palladium is 5:1 to 1.1:1 (e.g. 4:1 to 7:6), such as 3:1 to 1.25:1 (e.g. 2.5:1 to 1.25:1).

The diesel oxidation catalyst and/or the catalysed soot filter may each independently comprises a total amount of the support material of 0.1 to 4.5 g in$^{-3}$ (e.g. 0.25 to 4.0 g in$^{-3}$), preferably 0.5 to 3.0 g in$^{-3}$, more preferably 0.6 to 2.5 g in$^{-3}$ (e.g. 0.75 to 1.5 g in$^{-3}$).

When the emissions control device is a diesel oxidation catalyst, then the diesel oxidation catalyst may comprise a downstream zone. The downstream zone is disposed at an outlet end of the substrate. The downstream zone may be formulated to perform a specific function, such as capturing and/or trapping volatilised platinum or oxidising nitric oxide (NO$_x$) to nitrogen dioxide (NO$_2$).

The downstream zone may have a composition for capturing and/or trapping volatilised platinum. Such a zone reduces or prevents volatilised platinum from condensing on a downstream selective catalytic reduction catalyst. Compositions for capturing and/or trapping volatilised platinum are described in WO 2013/088133 A1, WO 2013/088132 A1, WO 2013/088128 A1, WO 2013/050784 A2 and International patent application no. PCT/GB2016/050285.

The downstream zone may comprise platinum, manganese or an oxide thereof, and a support material comprising alumina. The platinum, and manganese or an oxide thereof, are preferably disposed or support on the support material. It has been found that when manganese or an oxide thereof is included in a downstream that excellent NO oxidation activity can be obtained.

When the downstream zone comprises manganese, the support material preferably comprises, or consists essentially of, silica-alumina or alumina doped with silica.

When the downstream zone comprises manganese, then the downstream zone may further comprise palladium, such as palladium disposed or supported on the support material.

The downstream preferably has a ratio of platinum to palladium by weight of ≥2:1 (e.g. Pt:Pd 1:0 to 2:1), more preferably ≥4:1 (e.g. Pt:Pd 1:0 to 4:1).

The diesel oxidation catalyst may further comprise a hydrocarbon adsorbent material. The hydrocarbon adsorbent material may be a zeolite. The zeolite is preferably not a transition metal exchanged zeolite.

It is preferred that the zeolite is a medium pore zeolite (e.g. a zeolite having a maximum ring size of ten tetrahedral atoms) or a large pore zeolite (e.g. a zeolite having a maximum ring size of twelve tetrahedral atoms). It may be preferable that the zeolite is not a small pore zeolite (e.g. a zeolite having a maximum ring size of eight tetrahedral atoms).

Examples of suitable zeolites or types of zeolite include faujasite, clinoptilolite, mordenite, silicalite, ferrierite, zeolite X, zeolite Y, ultrastable zeolite Y, AEI zeolite, ZSM-5 zeolite, ZSM-12 zeolite, ZSM-20 zeolite, ZSM-34 zeolite, CHA zeolite, SSZ-3 zeolite, SAPO-5 zeolite, off retite, a beta zeolite or a copper CHA zeolite. The zeolite is preferably ZSM-5, a beta zeolite or a Y zeolite.

When the diesel oxidation catalyst comprises a hydrocarbon adsorbent material, then the total amount of hydrocarbon adsorbent material is typically 0.05 to 3.00 g in$^{-3}$, particularly 0.10 to 2.00 g in$^{-3}$, more particularly 0.2 to 1.0 g in$^{-3}$. For example, the total amount of hydrocarbon adsorbent material may be 0.8 to 1.75 g in$^{-3}$, such as 1.0 to 1.5 g in$^{-3}$.

An advantage of including a diesel oxidation catalyst (DOC) in the exhaust system is that the amount of N$_2$O generated by the DOC is minimal.

An advantage of including a catalysed soot filter (CSF) in the exhaust system is that the CSF removes soot (i.e. particulate matter). The CSF may be solely responsible for soot removal (e.g. when the first SCR catalyst has a flow-through substrate) or may contribute to the overall soot removal of the exhaust system (e.g. when the first SCR catalyst is a SCR-DPF).

The emissions control device may comprise a cold start concept (dCSC™) catalyst (either alone or with a catalysed soot filter (CSF)). In comparison to DOCs and CSFs, a cold start concept catalyst (referred to herein below as a "cold start catalyst") is able to store NO$_x$ at relatively low temperatures with a high storage efficiency. A cold start catalyst releases NO$_x$ when it reaches a certain temperature (unlike lean NO$_x$ traps (LNTs) or NO$_x$ storage catalysts (NSCs), which release NO$_x$ when the composition of the exhaust gas becomes "rich").

An advantage of cold start catalysts is that they are able to store NO$_x$ when the temperature of the exhaust system is relatively low, such that the first selective catalytic reduction catalyst and the second selective catalytic reduction catalyst have not reached their effective operating temperatures for reducing NO$_x$. The NO$_x$ release temperature of the cold start catalyst may be greater than or equal to the effective operating temperature of the first selective catalytic reduction catalyst and/or the second selective catalytic reduction catalyst. This means that the cold start catalyst can release NO$_x$ when the exhaust system has reached a temperature at which the first selective catalytic reduction catalyst and/or the second selective catalytic reduction catalyst can effectively reduce NO$_x$.

Typically, the cold start catalyst comprises a catalytic material disposed or supported on a substrate. The catalytic material comprises, or may consist essentially of, a molecular sieve catalyst. The molecular sieve catalyst comprises, or consists essentially of, a noble metal and a molecular sieve.

The molecular sieve catalyst can be prepared according to the method described in WO 2012/166868.

In general, the molecular sieve catalyst comprises, or consists essentially of, a noble metal-exchanged molecular sieve.

The noble metal is typically selected from the group consisting of palladium (Pd), platinum (Pt), rhodium (Rh) and mixtures of two or more thereof. More preferably, the noble metal is selected from palladium (Pd), platinum (Pt) and a mixture thereof.

Generally, it is preferred that the noble metal comprises, or consists of, palladium (Pd) and optionally a second metal selected from the group consisting of platinum (Pt) and rhodium (Rh). Even more preferably, the noble metal comprises, or consists of, palladium (Pd) and optionally platinum (Pt). More preferably, the molecular sieve catalyst comprises palladium as the only noble metal.

When the noble metal comprises, or consists of, palladium (Pd) and a second metal, then the ratio by mass of palladium (Pd) to the second metal is >1:1. More preferably, the ratio by mass of palladium (Pd) to the second metal is >1:1 and the molar ratio of palladium (Pd) to the second metal is >1:1.

The molecular sieve catalyst may further comprise a base metal. Thus, the molecular sieve catalyst may comprise, or consist essentially of, a noble metal, a molecular sieve and optionally a base metal. The molecular sieve catalyst may comprise, or consist essentially of, a noble metal- and base metal-exchanged molecular sieve.

The base metal may be selected from the group consisting of iron (Fe), copper (Cu), manganese (Mn), chromium (Cr), cobalt (Co), nickel (Ni), zinc (Zn) and tin (Sn), as well as mixtures of two or more thereof. It is preferred that the base metal is selected from the group consisting of iron, copper and cobalt, more preferably iron and copper. Even more preferably, the base metal is iron.

Alternatively, the molecular sieve catalyst may be substantially free of a base metal, such as a base metal selected from the group consisting of iron (Fe), copper (Cu), manganese (Mn), chromium (Cr), cobalt (Co), nickel (Ni), zinc (Zn) and tin (Sn), as well as mixtures of two or more thereof. Thus, the molecular sieve catalyst may not comprise a base metal.

In general, it is preferred that the molecular sieve catalyst does not comprise a base metal.

The molecular sieve is typically composed of aluminium, silicon, and/or phosphorus. The molecular sieve generally has a three-dimensional arrangement (e.g. framework) of $SiO_4$, $AlO_4$, and/or $PO_4$ that are joined by the sharing of oxygen atoms. The molecular sieve may have an anionic framework. The charge of the anionic framework may be counterbalanced by cations, such as by cations of alkali and/or alkaline earth elements (e.g., Na, K, Mg, Ca, Sr, and Ba), ammonium cations and/or protons.

Typically, the molecular sieve has an aluminosilicate framework, an aluminophosphate framework or a silico-aluminophosphate framework. The molecular sieve may have an aluminosilicate framework or an aluminophosphate framework. It is preferred that the molecular sieve has an aluminosilicate framework or a silico-aluminophosphate framework. More preferably, the molecular sieve has an aluminosilicate framework.

When the molecular sieve has an aluminosilicate framework, then the molecular sieve is preferably a zeolite.

In general, the molecular sieve may be a noble metal-exchanged molecular sieve (e.g. noble metal-exchanged molecular sieve having an aluminosilicate or an alumino-phosphate framework). The noble metal may be present on an extra-framework site on the external surface of the molecular sieve or within a channel, cavity or cage of the molecular sieve.

The molecular sieve catalyst generally has at least 1% by weight (i.e. of the amount of noble metal of the molecular sieve catalyst) of the noble metal (e.g. by exchange, such as located inside pores of the molecular sieve), preferably at least 5% by weight, more preferably at least 10% by weight, such as at least 25% by weight, even more preferably at least 50% by weight.

The molecular sieve may be selected from a small pore molecular sieve (i.e. a molecular sieve having a maximum ring size of eight tetrahedral atoms), a medium pore molecular sieve (i.e. a molecular sieve having a maximum ring size of ten tetrahedral atoms) and a large pore molecular sieve (i.e. a molecular sieve having a maximum ring size of twelve tetrahedral atoms). More preferably, the molecular sieve is selected from a small pore molecular sieve and a medium pore molecular sieve.

In a first molecular sieve catalyst embodiment, the molecular sieve is a small pore molecular sieve. The small pore molecular sieve preferably has a framework structure represented by a Framework Type Code (FTC) selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG and ZON, as well as a mixture or intergrowth of any two or more thereof. The intergrowth is preferably selected from KFI-SIV, ITE-RTH, AEW-UEI, AEI-CHA, and AEI-SAV. More preferably, the small pore molecular sieve has a framework structure with an FTC that is AEI, CHA or an AEI-CHA intergrowth. Even more preferably, the small pore molecular sieve has a framework structure with an FTC is AEI or CHA, particularly AEI.

Preferably, the small pore molecular sieve has an aluminosilicate framework or a silico-aluminophosphate framework. More preferably, the small pore molecular sieve has an aluminosilicate framework (i.e. the molecular sieve is a zeolite), especially when the small pore molecular sieve has a framework structure represented by a FTC that is AEI, CHA or an AEI-CHA intergrowth, particularly AEI or CHA.

In a second molecular sieve catalyst embodiment, the molecular sieve has a framework structure represented by a FTC selected from the group consisting of AEI, MFI, EMT, ERI, MOR, FER, BEA, FAU, CHA, LEV, MWW, CON and EUO, as well as mixtures of any two or more thereof.

In a third molecular sieve catalyst embodiment, the molecular sieve is a medium pore molecular sieve. The medium pore molecular sieve preferably has a framework structure represented by a FTC selected from the group consisting of MFI, FER, MWW and EUO, more preferably MFI.

In a fourth molecular sieve catalyst embodiment, the molecular sieve is a large pore molecular sieve. The large pore molecular sieve preferably has a framework structure represented by a FTC selected from the group consisting of CON, BEA, FAU, MOR and EMT, more preferably BEA.

In each of the first to fourth molecular sieve catalyst embodiments, the molecular sieve preferably has an aluminosilicate framework (e.g. the molecular sieve is a zeolite). Each of the aforementioned three-letter codes represents a framework type in accordance with the "IUPAC Commission on Zeolite Nomenclature" and/or the "Structure Commission of the International Zeolite Association".

The molecular sieve typically has a silica to alumina molar ratio (SAR) of 10 to 200 (e.g. 10 to 40), such as 10 to 100, more preferably 15 to 80 (e.g. 15 to 30). The SAR generally relates to a molecular having an aluminosilicate framework (e.g. a zeolite) or a silico-aluminophosphate framework, preferably an aluminosilicate framework (e.g. a zeolite).

The molecular sieve catalyst of the first, third and fourth molecular sieve catalyst embodiments (and also for some of the Framework Types of the second molecular sieve catalyst embodiment), particularly when the molecular sieve is a zeolite, may have an infrared spectrum having a characteristic absorption peak in a range of from 750 $cm^{-1}$ to 1050 $cm^{-1}$ (in addition to the absorption peaks for the molecular sieve itself). Preferably, the characteristic absorption peak is in the range of from 800 $cm^{-1}$ to 1000 $cm^{-1}$, more preferably in the range of from 850 $cm^{-1}$ to 975 $cm^{-1}$.

Generally, the cold start catalyst comprises a total loading of noble metal (i.e. of the molecular sieve catalyst, particularly in the first region) of $\geq 1$ g $ft^{-3}$, preferably >1 g $ft^{-3}$, and more preferably >2 g $ft^{-3}$.

The cold start catalyst typically comprises a total loading of noble metal (i.e. of the molecular sieve catalyst) of 1 to 250 g $ft^{-3}$, preferably 5 to 150 g $ft^{-3}$, more preferably 10 to 100 g $ft^{-3}$.

Generally, the or each substrate (i.e. of the emissions control device) is a monolith (also referred to herein as a substrate monolith). Such monoliths are well-known in the art.

The substrate, particularly the substrate monolith, preferably has a diameter of ≥7 inches (e.g. ≥17.8 cm). Such substrate monoliths tend to be used in heavy duty diesel applications.

Typically, a diesel oxidation catalyst comprises a substrate, which is a flow-through substrate (e.g. a flow-through monolith). A catalysed soot filter comprises a substrate, which is a filtering substrate (e.g. a filtering monolith). A cold start catalyst comprises a substrate, which is a flow-through substrate (e.g. a flow-through monolith) or a filtering substrate (e.g. a filtering monolith). It is preferred that the cold start catalyst comprises a substrate that is a flow-through substrate.

A flow-through monolith typically comprises a honeycomb monolith (e.g. a metal or ceramic honeycomb monolith) having a plurality of channels extending therethrough, which channels are open at both ends.

The filtering monolith may be a wall flow filter substrate monolith. A wall flow filter substrate monolith generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a wall (e.g. a wall having a porous structure).

In a wall-flow filter substrate monolith, each inlet channel is alternately separated from an outlet channel by a wall (e.g. of porous structure) and vice versa. It is preferred that the inlet channels and the outlet channels are arranged in a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

In general, the substrate may have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

Typically, the diesel oxidation catalyst and/or the catalysed soot filter and/or the cold start catalyst is substantially free of rhodium and/or is substantially free of a $NO_x$ storage component comprising, or consisting essentially of, an oxide, a carbonate or a hydroxide of an alkali metal, an alkaline earth metal and/or a rare earth metal. More preferably, the diesel oxidation catalyst and/or the catalysed soot filter and/or the cold start catalyst does not comprise rhodium and/or does not comprise a $NO_x$ storage component comprising, or consisting essentially of, an oxide, a carbonate or a hydroxide of an alkali metal, an alkaline earth metal and/or a rare earth metal.

It may preferable that the molecular sieve catalyst is substantially free of platinum. More preferably, the molecular sieve catalyst does not comprise platinum.

Injector for Introducing an Ammonia Precursor into the Exhaust Gas

The exhaust system of the invention comprises an injector for introducing an ammonia precursor into the exhaust gas. For the avoidance of doubt, the injector for introducing an ammonia precursor into the exhaust gas is not (e.g. it comprises different components to) the means for introducing gaseous ammonia into the exhaust gas as described below.

Typically, the injector is a liquid injector suitable for introducing a solution comprising an ammonia precursor into the exhaust gas.

The ammonia precursor is preferably urea or ammonium formate, more preferably urea. Urea dosing systems for SCR catalysts are known in the art.

In general, the injector atomizes the ammonia precursor, or a solution comprising the ammonia precursor, upon injection into the exhaust gas, such as by spraying the ammonia precursor or the solution comprising the ammonia precursor. The injector may be an airless injector or an air-assisted injector.

The injector is configured to introduce an ammonia precursor into the exhaust gas upstream of the selective catalytic reduction filter catalyst. It is preferred that the injector is configured to controllably introduce an amount of ammonia precursor into the exhaust gas upstream of the selective catalytic reduction filter catalyst. More preferably, the injector is configured to controllably introduce an amount of ammonia precursor into the exhaust gas upstream of the selective catalytic reduction filter catalyst to provide a molar ammonia to $NO_x$ ratio (ANR) of from 0.7 to 1.3 (e.g. 0.9 to 1.2), such as 1.0 to 1.2 (e.g. about 1:1).

The injector for introducing an ammonia precursor into the exhaust gas is (e.g. located) downstream of, preferably downstream of the outlet of, the emissions control device for oxidising carbon monoxide (CO) and/or hydrocarbons (HCs). When the emissions control device is either (i) a diesel oxidation catalyst (DOC) and a catalysed soot filter (CSF) or (ii) a cold start concept (dCSC™) catalyst and a catalysed soot filter (CSF), then preferably the injector is (e.g. located) downstream of the outlet of the CSF.

Typically, the emissions control device for oxidising carbon monoxide (CO) and/or hydrocarbons (HCs) has an outlet coupled, preferably fluidly coupled by an exhaust gas conduit, to an inlet of the selective catalytic reduction filter catalyst. The injector for introducing an ammonia precursor into the exhaust gas is preferably located between the outlet of the emissions control device and the inlet of the first selective catalytic reduction catalyst. The injector is preferably connected to an exhaust gas conduit between the outlet of the emissions control device and the inlet of the first selective catalytic reduction catalyst.

The injector for introducing an ammonia precursor into the exhaust gas is typically coupled, preferably fluidly coupled, to an ammonia precursor storage tank. Thus, the exhaust system of the invention may further comprise an ammonia precursor storage tank.

The injector for introducing an ammonia precursor into the exhaust gas may be electrically coupled to an engine management system. The engine management system may be configured to trigger the injector to inject ammonia precursor into the exhaust gas when the temperature of the exhaust gas is $\geq T_1$, wherein $T_1$ is 200° C., preferably 215° C., more preferably 230° C. It is particularly preferred that the engine management system is configured to trigger the injector to inject ammonia precursor into the exhaust gas when the temperature of the exhaust gas is $\geq T_1$ and when the molar ANR of the exhaust gas is <0.7, preferably <0.9.

The engine management system and/or the injector for introducing an ammonia precursor into the exhaust gas may be electrically coupled to a temperature sensor (e.g. a thermocouple) located upstream, preferably directly upstream, of the selective catalytic reduction filter catalyst. The temperature sensor is located downstream of the emissions control device for oxidising carbon monoxide (CO) and/or hydrocarbons (HCs). The temperature sensor is suitable for determining $T_1$.

Additionally or alternatively, the engine management system and/or the injector for introducing an ammonia precursor into the exhaust gas may be electrically coupled to a $NO_x$ sensor located upstream, preferably directly upstream, of the first selective catalytic reduction catalyst. The $NO_x$ sensor is preferably located downstream of the injector for introducing an ammonia precursor into the exhaust gas.

The exhaust system may further comprise a mixer, wherein the mixer is (e.g. located, such as in the exhaust gas conduit) upstream of the first selective catalytic reduction catalyst and downstream of the injector for introducing an ammonia precursor into the exhaust gas.

First Selective Catalytic Reduction (SCR) Catalyst

The exhaust system of the invention comprises a first selective catalytic reduction catalyst. The first SCR catalyst is (e.g. located) downstream of the injector for introducing an ammonia precursor into the exhaust gas. The first SCR catalyst is upstream of the second selective catalytic reduction (SCR) catalyst.

The first SCR catalyst comprises a substrate and a first SCR catalyst composition. The substrate may be a flow-through substrate or a filtering substrate. The term "first" in the expression "first selective catalytic reduction composition" is used to delineate the composition from other selective catalytic reduction compositions that are present in the exhaust system.

When the first SCR catalyst has a flow-through substrate, then the substrate may comprise the first SCR catalyst composition (i.e. the first SCR catalyst is obtained by extrusion) or the first SCR catalyst composition may be disposed or supported on the substrate (i.e. the first SCR catalyst composition is applied onto the substrate by a washcoating method). It is preferred that first SCR catalyst composition is disposed or supported on the substrate.

In general, it is preferred that the first SCR catalyst has a filtering substrate. When the first SCR catalyst has a filtering substrate, then it is a selective catalytic reduction filter catalyst, which is referred to herein by the abbreviation "SCR-DPF". The SCR-DPF comprises a filtering substrate and the first selective catalytic reduction (SCR) composition.

The first selective catalytic reduction composition may comprise, or consist essentially of, a metal oxide based SCR catalyst formulation, a molecular sieve based SCR catalyst formulation or mixture thereof. Such SCR catalyst formulations are known in the art.

The first selective catalytic reduction composition may comprise, or consist essentially of, a metal oxide based SCR catalyst formulation. The metal oxide based SCR catalyst formulation comprises vanadium or tungsten or a mixture thereof supported on a refractory oxide. The refractory oxide may be selected from the group consisting of alumina, silica, titania, zirconia, ceria and combinations thereof.

It may be preferable that the metal oxide based SCR catalyst formulation comprises, or consists essentially of, an oxide of vanadium (e.g. $V_2O_5$) and/or an oxide of tungsten (e.g. $WO_3$) supported on a refractory oxide selected from the group consisting of titania (e.g. $TiO_2$), ceria (e.g. $CeO_2$), and a mixed or composite oxide of cerium and zirconium (e.g. $Ce_xZr_{(1-x)}O_2$, wherein x=0.1 to 0.9, preferably x=0.2 to 0.5).

When the refractory oxide is titania (e.g. $TiO_2$), then preferably the concentration of the oxide of vanadium is from 0.5 to 6 wt. % (e.g. of the metal oxide based SCR formulation) and/or the concentration of the oxide of tungsten (e.g. $WO_3$) is from 5 to 20 wt. %. More preferably, the oxide of vanadium (e.g. $V_2O_5$) and the oxide of tungsten (e.g. $WO_3$) are supported on titania (e.g. $TiO_2$).

When the refractory oxide is ceria (e.g. $CeO_2$), then preferably the concentration of the oxide of vanadium is from 0.1 to 9 wt. % (e.g. of the metal oxide based SCR formulation) and/or the concentration of the oxide of tungsten (e.g. $WO_3$) is from 0.1 to 9 wt. %.

In general, it is preferred that the metal oxide based SCR catalyst formulation comprises, or consists essentially of, an oxide of vanadium (e.g. $V_2O_5$) and optionally an oxide of tungsten (e.g. $WO_3$), supported on titania (e.g. $TiO_2$). It has been found that metal oxide based SCR catalyst formulations produce significantly less $N_2O$ as a by-product, especially when the metal oxide based SCR catalyst formulation is disposed upstream of a copper containing molecular sieve based SCR catalyst formulation.

The first selective catalytic reduction composition may comprise, or consist essentially of, a molecular sieve based SCR catalyst formulation. The molecular sieve based SCR catalyst formulation comprises a molecular sieve, which is optionally a transition metal exchanged molecular sieve. It is preferable that the SCR catalyst formulation comprises a transition metal exchanged molecular sieve.

In general, the molecular sieve based SCR catalyst formulation may comprise a molecular sieve having an aluminosilicate framework (e.g. zeolite), an aluminophosphate framework (e.g. AlPO), a silicoaluminophosphate framework (e.g. SAPO), a heteroatom-containing aluminosilicate framework, a heteroatom-containing aluminophosphate framework (e.g. MeAlPO, where Me is a metal), or a heteroatom-containing silicoaluminophosphate framework (e.g. MeAPSO, where Me is a metal). The heteroatom (i.e. in a heteroatom-containing framework) may be selected from the group consisting of boron (B), gallium (Ga), titanium (Ti), zirconium (Zr), zinc (Zn), iron (Fe), vanadium (V) and combinations of any two or more thereof. It is preferred that the heteroatom is a metal (e.g. each of the above heteroatom-containing frameworks may be a metal-containing framework).

It is preferable that the molecular sieve based SCR catalyst formulation comprises, or consist essentially of, a molecular sieve having an aluminosilicate framework (e.g. zeolite) or a silicoaluminophosphate framework (e.g. SAPO). More preferably, the molecular sieve has an aluminosilicate framework (e.g. zeolite).

When the molecular sieve has an aluminosilicate framework (e.g. the molecular sieve is a zeolite), then typically the molecular sieve has a silica to alumina molar ratio (SAR) of from 5 to 200 (e.g. 10 to 200), preferably 10 to 100 (e.g. 10 to 30 or 20 to 80), such as 12 to 40, more preferably 15 to 30.

Typically, the molecular sieve is microporous. A microporous molecular sieve has pores with a diameter of less than 2 nm (e.g. in accordance with the IUPAC definition of "microporous" [see *Pure & Appl. Chem.*, 66(8), (1994), 1739-1758)]).

The molecular sieve based SCR catalyst formulation may comprise a small pore molecular sieve (e.g. a molecular sieve having a maximum ring size of eight tetrahedral atoms), a medium pore molecular sieve (e.g. a molecular sieve having a maximum ring size of ten tetrahedral atoms) or a large pore molecular sieve (e.g. a molecular sieve having a maximum ring size of twelve tetrahedral atoms) or a combination of two or more thereof.

When the molecular sieve is a small pore molecular sieve, then the small pore molecular sieve may have a framework structure represented by a Framework Type Code (FTC) selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG and ZON, or a mixture and/or an intergrowth of two or more thereof. Preferably, the small pore molecular sieve has a framework structure represented by a FTC selected from the group consisting of CHA, LEV, AEI, AFX, ERI, SFW, KFI, DDR and ITE. More preferably, the small pore molecular sieve has a framework structure represented by a FTC selected from the group consisting of CHA and AEI. The small pore molecular sieve may have a framework structure represented by the FTC CHA. The small pore molecular sieve may have a framework structure represented by the FTC AEI. When the small pore molecular sieve is a zeolite and has a framework represented by the FTC CHA, then the zeolite may be chabazite.

When the molecular sieve is a medium pore molecular sieve, then the medium pore molecular sieve may have a framework structure represented by a Framework Type Code (FTC) selected from the group consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, -PAR, PCR, PON, PUN, RRO, RSN, SFF, SFG, STF, STI, STT, STW, -SVR, SZR, TER, TON, TUN, UOS, VSV, WEI and WEN, or a mixture and/or an intergrowth of two or more thereof. Preferably, the medium pore molecular sieve has a framework structure represented by a FTC selected from the group consisting of FER, MEL, MFI and STT. More preferably, the medium pore molecular sieve has a framework structure represented by a FTC selected from the group consisting of FER and MFI, particularly MFI. When the medium pore molecular sieve is a zeolite and has a framework represented by the FTC FER or MFI, then the zeolite may be ferrierite, silicalite or ZSM-5.

When the molecular sieve is a large pore molecular sieve, then the large pore molecular sieve may have a framework structure represented by a Framework Type Code (FTC) selected from the group consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, -RON, RWY, SAF, SAO, SBE, SBS, SBT, SEW, SFE, SFO, SFS, SFV, SOF, SOS, STO, SSF, SSY, USI, UWY and VET, or a mixture and/or an intergrowth of two or more thereof. Preferably, the large pore molecular sieve has a framework structure represented by a FTC selected from the group consisting of AFI, BEA, MAZ, MOR and OFF. More preferably, the large pore molecular sieve has a framework structure represented by a FTC selected from the group consisting of BEA, MOR and MFI. When the large pore molecular sieve is a zeolite and has a framework represented by the FTC BEA, FAU or MOR, then the zeolite may be a beta zeolite, faujasite, zeolite Y, zeolite X or mordenite.

In general, it is preferred that the molecular sieve is a small pore molecular sieve.

The molecular sieve based SCR catalyst formulation preferably comprises a transition metal exchanged molecular sieve. The transition metal may be selected from the group consisting of cobalt, copper, iron, manganese, nickel, palladium, platinum, ruthenium and rhenium. It is preferred that the transition metal is selected from the group consisting of copper and iron.

The transition metal may be iron. An advantage of SCR catalyst formulations containing an iron exchanged molecular sieve is that such formulations have excellent $NO_x$ reduction activity at a higher temperature than, for example, a copper exchanged molecular sieve. An iron exchanged molecular sieve may also generate a minimal amount of $N_2O$ (compared to other types of SCR catalyst formulation).

The transition metal may be copper. An advantage of SCR catalyst formulations containing a copper exchanged molecular sieve is that such formulations have excellent low temperature $NO_x$ reduction activity (e.g. it may be superior to the low temperature $NO_x$ reduction activity of an iron exchanged molecular sieve).

The transition metal may be present on an extra-framework site on the external surface of the molecular sieve or within a channel, cavity or cage of the molecular sieve.

Typically, the transition metal exchanged molecular sieve comprises an amount of 0.10 to 10% by weight of the transition metal exchanged molecular, preferably an amount of 0.2 to 5% by weight.

In general, the first selective catalytic reduction catalyst comprises the first selective catalytic reduction composition in a total concentration of 0.5 to 4.0 g in$^{-3}$, preferably 1.0 to 3.0 4.0 g in$^{-3}$.

It may be preferable that the first SCR catalyst composition comprises a mixture of a metal oxide based SCR catalyst formulation and a molecular sieve based SCR catalyst formulation. It is preferred that the (a) metal oxide based SCR catalyst formulation comprises, or consists essentially of, an oxide of vanadium (e.g. $V_2O_5$) and optionally an oxide of tungsten (e.g. $WO_3$), supported on titania (e.g. TiO$_2$) and (b) the molecular sieve based SCR catalyst formulation comprises a transition metal exchanged molecular sieve. More preferably, the transition metal of the transition metal exchanged molecular sieve is iron. The zeolite preferably has a framework structure represented by MFI.

When the first SCR catalyst is an SCR-DPF, then the filtering substrate is preferably a wall flow filter substrate monolith, such as described above in relation to a catalysed soot filter.

The wall flow filter substrate monolith (e.g. of the SCR-DPF) typically has a cell density of 60 to 400 cells per square inch (cpsi). It is preferred that the wall flow filter substrate monolith has a cell density of 100 to 350 cpsi, more preferably 200 to 300 cpsi.

The wall flow filter substrate monolith may have a wall thickness (e.g. average internal wall thickness) of 0.20 to 0.50 mm, preferably 0.25 to 0.35 mm (e.g. about 0.30 mm).

Generally, the uncoated wall flow filter substrate monolith has a porosity of from 50 to 80%, preferably 55 to 75%, and more preferably 60 to 70%.

The uncoated wall flow filter substrate monolith typically has a mean pore size of at least 5 µm. It is preferred that the mean pore size is from 10 to 40 µm, such as 15 to 35 µm, more preferably 20 to 30 µm.

The wall flow filter substrate may have a symmetric cell design or an asymmetric cell design.

In general for an SCR-DPF, the first selective catalytic reduction composition is disposed within the wall of the wall-flow filter substrate monolith. Additionally, the first selective catalytic reduction composition may be disposed on the walls of the inlet channels and/or on the walls of the outlet channels.

Second Selective Catalytic Reduction (SCR) Catalyst

The exhaust system of the invention comprises a second selective catalytic reduction (SCR) catalyst. The second SCR catalyst is downstream, preferably directly downstream, of the first SCR catalyst. Thus, an outlet of the first SCR catalyst is typically coupled (e.g. fluidly coupled) to an inlet of the second SCR catalyst.

The first SCR catalyst and the second SCR catalyst may be close-coupled. The distance between the outlet of the first SCR catalyst and the second SCR catalyst may be 1.0 mm to 300 mm, preferably 3 mm to 200 mm, more preferably 5 mm to 150 mm (e.g. 8 mm to 100 mm), such as 10 mm to 80 mm (e.g. 12 mm to 70 mm), and even more preferably 15 mm to 50 mm. This is advantageous for thermal transfer and for space saving.

The second SCR catalyst comprises a flow-through substrate and a second selective catalytic reduction (SCR) composition. The term "second" in the expression "second selective catalytic reduction composition" is used to delineate the composition from other selective catalytic reduction compositions that are present in the exhaust system. It does not require that the second SCR catalyst has two or more selective catalytic reduction compositions.

The second selective catalytic reduction composition may comprise, or consist essentially of, a metal oxide based SCR catalyst formulation, a molecular sieve based SCR catalyst formulation or mixture thereof. The second selective catalytic reduction composition may be the same as or different to the first selective catalytic reduction composition.

The second selective catalytic reduction composition may comprise, or consist essentially of, a metal oxide based SCR catalyst formulation. The metal oxide based SCR catalyst formulation comprises vanadium or tungsten or a mixture thereof supported on a refractory oxide. The refractory oxide may be selected from the group consisting of alumina, silica, titania, zirconia, ceria and combinations thereof.

It may be preferable that the metal oxide based SCR catalyst formulation comprises, or consists essentially of, an oxide of vanadium (e.g. V$_2$O$_5$) and/or an oxide of tungsten (e.g. WO$_3$) supported on a refractory oxide selected from the group consisting of titania (e.g. TiO$_2$), ceria (e.g. CeO$_2$), and a mixed or composite oxide of cerium and zirconium (e.g. Ce$_x$Zr$_{(1-x)}$O$_2$, wherein x=0.1 to 0.9, preferably x=0.2 to 0.5).

When the refractory oxide is titania (e.g. TiO$_2$), then preferably the concentration of the oxide of vanadium is from 0.5 to 6 wt. % (e.g. of the metal oxide based SCR formulation) and/or the concentration of the oxide of tungsten (e.g. WO$_3$) is from 5 to 20 wt. %. More preferably, the oxide of vanadium (e.g. V$_2$O$_5$) and the oxide of tungsten (e.g. WO$_3$) are supported on titania (e.g. TiO$_2$).

When the refractory oxide is ceria (e.g. CeO$_2$), then preferably the concentration of the oxide of vanadium is from 0.1 to 9 wt. % (e.g. of the metal oxide based SCR formulation) and/or the concentration of the oxide of tungsten (e.g. WO$_3$) is from 0.1 to 9 wt. %.

In general, it is preferred that the metal oxide based SCR catalyst formulation comprises, or consists essentially of, an oxide of vanadium (e.g. V$_2$O$_5$) and optionally an oxide of tungsten (e.g. WO$_3$), supported on titania (e.g. TiO$_2$). It has been found that metal oxide based SCR catalyst formulations produce significantly less N$_2$O as a by-product.

The second selective catalytic reduction composition may comprise, or consist essentially of, a molecular sieve based SCR catalyst formulation. The molecular sieve based SCR catalyst formulation comprises a molecular sieve, which is optionally a transition metal exchanged molecular sieve. It is preferable that the SCR catalyst formulation comprises a transition metal exchanged molecular sieve.

In general, the molecular sieve based SCR catalyst formulation may comprise a molecular sieve having an aluminosilicate framework (e.g. zeolite), an aluminophosphate framework (e.g. AlPO), a silicoaluminophosphate framework (e.g. SAPO), a heteroatom-containing aluminosilicate framework, a heteroatom-containing aluminophosphate framework (e.g. MeAlPO where Me is a metal), or a heteroatom-containing silicoaluminophosphate framework (e.g. MeAPSO, where Me is a metal). The heteroatom (i.e. in a heteroatom-containing framework) may be selected from the group consisting of boron (B), gallium (Ga), titanium (Ti), zirconium (Zr), zinc (Zn), iron (Fe), vanadium (V) and combinations of any two or more thereof. It is preferred that the heteroatom is a metal (e.g. each of the above heteroatom-containing frameworks may be a metal-containing framework).

It is preferable that the molecular sieve based SCR catalyst formulation comprises, or consist essentially of, a molecular sieve having an aluminosilicate framework (e.g. zeolite) or a silicoaluminophosphate framework (e.g. SAPO). More preferably, the molecular sieve has an aluminosilicate framework (e.g. zeolite).

When the molecular sieve has an aluminosilicate framework (e.g. the molecular sieve is a zeolite), then typically the molecular sieve has a silica to alumina molar ratio (SAR) of from 5 to 200 (e.g. 10 to 200), preferably 10 to 100 (e.g. 10 to 30 or 20 to 80), such as 12 to 40, more preferably 15 to 30.

Typically, the molecular sieve is microporous. A microporous molecular sieve has pores with a diameter of less than 2 nm (e.g. in accordance with the IUPAC definition of "microporous" [see *Pure & Appl. Chem.*, 66(8), (1994), 1739-1758)]).

The molecular sieve based SCR catalyst formulation may comprise a small pore molecular sieve (e.g. a molecular sieve having a maximum ring size of eight tetrahedral atoms), a medium pore molecular sieve (e.g. a molecular sieve having a maximum ring size of ten tetrahedral atoms) or a large pore molecular sieve (e.g. a molecular sieve having a maximum ring size of twelve tetrahedral atoms) or a combination of two or more thereof.

When the molecular sieve is a small pore molecular sieve, then the small pore molecular sieve may have a framework structure represented by a Framework Type Code (FTC) selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG and ZON, or a mixture and/or an intergrowth of two or more thereof. Preferably, the small pore molecular sieve has a framework structure represented by a FTC selected from the group consisting of CHA, LEV, AEI, AFX, ERI, SFW, KFI, DDR and ITE. More preferably, the small pore molecular sieve has a framework structure represented by a FTC selected from the group consisting of CHA and AEI. The small pore molecular sieve may have a framework structure represented by the FTC CHA. The small pore molecular sieve may have a framework structure represented by the FTC AEI. When the small pore molecular sieve is a zeolite and has a framework represented by the FTC CHA, then the zeolite may be chabazite.

When the molecular sieve is a medium pore molecular sieve, then the medium pore molecular sieve may have a framework structure represented by a Framework Type Code (FTC) selected from the group consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, -PAR, PCR, PON, PUN, RRO, RSN, SFF, SFG, STF, STI, STT, STW, -SVR, SZR, TER, TON, TUN, UOS, VSV, WEI and WEN, or a mixture and/or an intergrowth of two or more thereof. Preferably, the medium pore molecular sieve has a framework structure represented by a FTC selected from the group consisting of FER, MEL, MFI and STT. More preferably, the medium pore molecular sieve has a framework structure represented by a FTC selected from the group consisting of FER and MFI. When the medium pore molecular sieve is a zeolite and has a framework represented by the FTC FER or MFI, then the zeolite may be ferrierite, silicalite or ZSM-5.

When the molecular sieve is a large pore molecular sieve, then the large pore molecular sieve may have a framework structure represented by a Framework Type Code (FTC) selected from the group consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, -RON, RWY, SAF, SAO, SBE, SBS, SBT, SEW, SFE, SFO, SFS, SFV, SOF, SOS, STO, SSF, SSY, USI, UWY and VET, or a mixture and/or an intergrowth of two or more thereof. Preferably, the large pore molecular sieve has a framework structure represented by a FTC selected from the group consisting of AFI, BEA, MAZ, MOR and OFF. More preferably, the large pore molecular sieve has a framework structure represented by a FTC selected from the group consisting of BEA, MOR and MFI. When the large pore molecular sieve is a zeolite and has a framework represented by the FTC BEA, FAU or MOR, then the zeolite may be a beta zeolite, faujasite, zeolite Y, zeolite X or mordenite.

In general, it is preferred that the molecular sieve is a small pore molecular sieve.

The molecular sieve based SCR catalyst formulation preferably comprises a transition metal exchanged molecular sieve. The transition metal may be selected from the group consisting of cobalt, copper, iron, manganese, nickel, palladium, platinum, ruthenium and rhenium. It is preferred that the transition metal is selected from the group consisting of copper and iron.

The transition metal may be iron. An advantage of SCR catalyst formulations containing an iron exchanged molecular sieve is that such formulations have excellent $NO_x$ reduction activity at a higher temperature than, for example, a copper exchanged molecular sieve. An iron exchanged molecular sieve may also generate a minimal amount of $N_2O$ (compared to other types of SCR catalyst formulation).

The transition metal may be copper. An advantage of SCR catalyst formulations containing a copper exchanged molecular sieve is that such formulations have excellent low temperature $NO_x$ reduction activity (e.g. it may be superior to the low temperature $NO_x$ reduction activity of an iron exchanged molecular sieve).

The transition metal may be present on an extra-framework site on the external surface of the molecular sieve or within a channel, cavity or cage of the molecular sieve.

Typically, the transition metal exchanged molecular sieve comprises an amount of 0.10 to 10% by weight of the transition metal exchanged molecular, preferably an amount of 0.2 to 5% by weight.

It may be preferable that the second SCR catalyst composition comprises a mixture of a metal oxide based SCR catalyst formulation and a molecular sieve based SCR catalyst formulation. It is preferred that the (a) metal oxide based SCR catalyst formulation comprises, or consists essentially of, an oxide of vanadium (e.g. $V_2O_5$) and optionally an oxide of tungsten (e.g. $WO_3$), supported on titania (e.g. $TiO_2$) and (b) the molecular sieve based SCR catalyst formulation comprises a transition metal exchanged molecular sieve. More preferably, the transition of the transition metal exchanged molecular sieve is iron.

In general, the second SCR catalyst comprises the second selective catalytic reduction composition in a total concentration of 0.5 to 4.0 g in$^{-3}$, such as 1.0 to 3.5 g in$^{-3}$ The second SCR catalyst comprises a flow-through substrate. The flow-through substrate is preferably a flow-through monolith, such as described above in relation to a diesel oxidation catalyst.

The flow-through monolith (e.g. of the second SCR catalyst) typically has a cell density of 200 to 1000 cells per square inch (cpsi). It is preferred that the flow-through monolith has a cell density of 400 to 1000 cpsi, more preferably 500 to 900 cpsi (e.g. 600 to 800 cpsi).

The flow-through monolith may have a wall thickness (e.g. average internal wall thickness) of 0.05 to 0.35 mm, preferably 0.06 to 0.25 mm, more preferably 0.07 to 0.15 mm (e.g. 0.07 to 0.12 mm).

The substrate of the second SCR catalyst may comprise the second SCR catalyst composition (i.e. the second SCR catalyst is obtained by extrusion) or the second SCR catalyst composition may be disposed or supported on the substrate (i.e. the second SCR catalyst composition is applied onto the substrate by a washcoating method). It is preferred that second SCR catalyst composition is disposed or supported on the substrate.

Generally, the uncoated flow-through monolith has a porosity of from 20 to 80%, preferably 40 to 70%, and more preferably 45 to 60%. It is advantageous for the uncoated flow-through monolith to have a high porosity because it allows a relatively high concentration of the second SCR catalyst composition to be disposed on the substrate.

The second SCR catalyst may comprise a downstream zone, preferably at an outlet end of the substrate. The downstream zone typically comprises an ammonia slip catalyst (ASC) formulation. The ammonia slip catalyst (ASC) formulation is suitable for oxidising ammonia (e.g. the ammonia that has not been oxidised to nitrogen by the second selective catalytic reduction composition). Ammonia slip catalyst (ASC) formulations are known in the art.

Electrically Heatable Conduit

The exhaust system of the invention may further comprise an electrically heatable conduit. The electrically heatable conduit is (e.g. located) between the emissions control device for oxidising carbon monoxide (CO) and/or hydrocarbons (HCs) and the first selective catalytic reduction catalyst (i.e. downstream of the emissions control device and upstream of the first SCR catalyst). The electrically heatable conduit is for heating the exhaust gas output from the emissions control device when it has a relatively low temperature. By electrically heating the exhaust gas at this position it is possible to rapidly bring the exhaust gas up to the effective operating temperatures of the downstream first SCR catalyst and the second SCR catalyst for the treatment of $NO_x$.

The electrically heatable conduit is typically part (i.e. only part of) of the exhaust gas conduit between the outlet of the emissions control device and the inlet of the selective catalytic reduction filter catalyst. When the emissions control device is either (i) a diesel oxidation catalyst (DOC) and a catalysed soot filter (CSF) or (ii) a cold start concept (dCSC™) catalyst and a catalysed soot filter (CSF), then preferably the electrically heatable conduit is (e.g. located) downstream of the outlet of the CSF.

It is preferred that the electrically heatable conduit is coupled (e.g. fluidly coupled), preferably directly coupled, to the outlet of the emissions control device.

Typically, the electrically heatable conduit is upstream of the injector for introducing an ammonia precursor into the exhaust gas. When the exhaust system comprises a temperature sensor (e.g. for determining $T_1$) and/or a $NO_x$ sensor, then preferably the electrically heatable conduit is (e.g. located) upstream of the temperature sensor (e.g. for determining $T_1$) and/or a $NO_x$ sensor.

The electrically heatable conduit typically comprises an electrical power connection, preferably at least two electrical power connections, more preferably only two electrical power connections. Each electrical power connection may be electrically connected to the electrically heatable substrate and an electrical power source. The electrically heatable conduit can be heated by Joule heating, where an electric current through a resistor converts electrical energy into heat energy.

The electrically heatable conduit is an electrically heating conduit, in use.

The electrically heatable conduit may be electrically coupled to an engine management system. The engine management system may be configured to activate the electrically heatable conduit when the temperature of the exhaust gas is <T1, wherein $T_1$ is 230° C., preferably 215° C., more preferably 200° C.

Additionally or alternatively, the electrically heatable conduit may be coupled to a temperature sensor (e.g. a thermocouple) located upstream, preferably directly upstream, of the selective catalytic reduction filter catalyst. The temperature sensor is located downstream of the emissions control device for oxidising carbon monoxide (CO) and/or hydrocarbons (HCs). The temperature sensor is suitable for determining $T_1$.

Gaseous Ammonia Doser

The exhaust of the invention may further comprise a means for introducing gaseous ammonia into the exhaust gas. The means for introducing gaseous ammonia into the exhaust gas is preferably a means for introducing gaseous ammonia directly into the exhaust gas, particularly when the temperature of the exhaust gas is <$T_1$, wherein $T_1$ is 230° C., preferably 215° C., more preferably 200° C. For the avoidance of doubt, the means for introducing gaseous ammonia into the exhaust gas introduces ammonia in gaseous form directly into the exhaust gas stream. The gaseous ammonia is not generated in situ within the main exhaust gas stream, such as from an ammonia precursor.

The means for introducing gaseous ammonia into the exhaust gas is disposed downstream of the emissions control device for oxidising carbon monoxide (CO) and/or hydrocarbons (HCs) and upstream of the first selective catalytic reduction catalyst. It is preferred that the means for introducing gaseous ammonia into the exhaust gas is configured to controllably introduce an amount of gaseous ammonia into the exhaust gas upstream of the first selective catalytic reduction catalyst to provide a molar ammonia to $NO_x$ ratio (ANR) of from 0.7 to 1.3 (e.g. 0.9 to 1.2), such as 1.0 to 1.2 (e.g. about 1:1).

It has been found that the introduction of gaseous ammonia into the exhaust gas, particularly at relatively low temperatures, can facilitate the conversion of $NO_x$ over the first SCR catalyst and/or the second SCR catalyst. It is not possible to inject ammonia precursors, such as urea, at relatively low temperatures into the exhaust gas because ammonia will not be formed in situ at such temperatures. In fact, urea can crystallise within the exhaust system at low temperatures.

The means for introducing gaseous ammonia into the exhaust gas may comprise an ammonia doser (e.g. a gaseous ammonia doser). The ammonia doser is typically coupled (e.g. fluidly coupled) to the conduit between the emissions control device for oxidising carbon monoxide (CO) and/or hydrocarbons (HCs) and the selective catalytic reduction filter catalyst (i.e. downstream of the outlet of the emissions control device and upstream of the inlet of the first SCR catalyst). When the emissions control device is either (i) a diesel oxidation catalyst (DOC) and a catalysed soot filter (CSF) or (ii) a cold start concept (dCSC™) catalyst and a catalysed soot filter (CSF), then preferably the ammonia doser is (e.g. located) downstream of the outlet of the CSF.

When the exhaust system comprises a mixer, then preferably the ammonia doser is disposed upstream of the mixer.

The ammonia doser may be disposed upstream or downstream of the injector for introducing an ammonia precursor into the exhaust gas. It is preferred that the ammonia doser is disposed upstream of the injector for introducing an ammonia precursor into the exhaust gas.

When the exhaust system comprises an electrically heatable conduit, then the ammonia doser may be disposed upstream or downstream of the electrically heatable conduit. It is preferred that the ammonia doser is disposed downstream of the electrically heatable conduit.

The means for introducing gaseous ammonia into the exhaust gas may further comprise a means for generating gaseous ammonia from an ammonia precursor. The means for generating gaseous ammonia from an ammonia precursor is coupled (e.g. fluidly coupled) to the ammonia doser. The means for generating gaseous ammonia from an ammonia precursor is located in a secondary exhaust gas conduit. The ammonia doser is located within the main exhaust system.

Typically, the means for generating gaseous ammonia from an ammonia precursor comprises:
(i) an injector for introducing an ammonia precursor into a secondary exhaust gas conduit; and
(ii) a hydrolysis catalyst for converting the ammonia precursor into gaseous ammonia;
   wherein the injector for introducing an ammonia precursor into a secondary exhaust gas conduit is (e.g. located) upstream of the hydrolysis catalyst.

For the avoidance of doubt, the injector for introducing an ammonia precursor into a secondary exhaust gas conduit is an additional injector to the injector described above for introducing an ammonia precursor into the main exhaust gas stream. The injector for introducing an ammonia precursor into a secondary exhaust gas conduit is referred to herein as a "second injector".

Typically, the second injector is a liquid injector suitable for introducing a solution comprising an ammonia precursor into the secondary exhaust gas conduit. The ammonia precursor is preferably urea or ammonium formate, more preferably urea.

The secondary injector atomizes the ammonia precursor or a solution comprising the ammonia precursor upon injection into the secondary exhaust gas conduit upstream of the hydrolysis catalyst, such as by spraying the ammonia precursor or the solution comprising the ammonia precursor. The secondary injector may be an airless injector or an air-assisted injector.

The secondary injector is configured to introduce an ammonia precursor into the secondary exhaust gas conduit upstream of the hydrolysis catalyst. It is preferred that the secondary injector is configured to controllably introduce an amount of ammonia precursor into the secondary exhaust gas conduit upstream of the hydrolysis catalyst.

The secondary injector is typically coupled (e.g. fluidly coupled) to an ammonia precursor storage tank, preferably the ammonia precursor storage tank is coupled to the injector for introducing an ammonia precursor into the exhaust gas (i.e. the main injector).

The hydrolysis catalyst for converting the ammonia precursor into gaseous ammonia typically comprises a substrate and a hydrolysis catalyst composition disposed or supported on the substrate. The substrate is preferably a flow-through substrate, more preferably a cordierite flow-through substrate. Catalyst compositions for hydrolysing urea are known in the art.

The hydrolysis catalyst composition may comprise, or consist essentially of titanium dioxide ($TiO_2$), such as Au-doped $TiO_2$.

The outlet of the hydrolysis catalyst composition is typically coupled (e.g. fluidly coupled) to the ammonia doser.

Generally, the secondary exhaust gas conduit is coupled (e.g. fluidly coupled) to an exhaust manifold of the diesel engine. It is preferred that the second exhaust gas conduit is coupled to the exhaust manifold upstream of a turbocharger. The secondary exhaust gas conduit by-passes the turbocharger. In this configuration, a small amount of hot exhaust gas (approximately 1.5 to 7.0%) is pulled from the engine into the secondary exhaust gas conduit (i.e. a side flow system). When the exhaust gas is diverted from the turbocharger to the secondary exhaust gas conduit, the temperature of the exhaust gas in the secondary exhaust gas conduit is significantly higher than the temperature in the main exhaust gas stream.

The means for generating gaseous ammonia from an ammonia precursor may further comprise a particulate filter, preferably a catalysed soot filter (CSF).

The particulate filter or CSF is disposed in the second exhaust gas conduit upstream of the injector for introducing an ammonia precursor into the secondary exhaust gas conduit. The particulate filter or CSF is also upstream of the hydrolysis catalyst for converting the ammonia precursor into gaseous ammonia.

The secondary exhaust gas conduit may comprise a valve for closing the secondary exhaust gas conduit (e.g. when the temperature ($T_1$) of the exhaust gas between the emissions control device and the first SCR catalyst is is 200° C., preferably 215° C., more preferably 230° C.). The valve may be electrically coupled to the engine management system.

Typically, the valve is disposed upstream of the secondary injector, preferably upstream of the particulate filter or the CSF.

Ammonia Slip Catalyst (ASC)

In addition or as alternative to an ammonia slip catalyst (ASC) formulation being present in a downstream zone of the SCR catalyst, the exhaust system may further comprise an ammonia slip catalyst (ASC) (i.e. a separate ASC). The ASC comprises an ammonia slip catalyst formulation disposed on a substrate (i.e. a substrate that is separate to the substrate of the second SCR catalyst).

Typically, the ammonia slip catalyst is downstream, preferably directly downstream, of the second SCR catalyst. Thus, an outlet of the second SCR catalyst is typically coupled (e.g. fluidly coupled) to an inlet of the ammonia slip catalyst.

The substrate of the ammonia slip catalyst is preferably a flow-through monolith.

Vehicle

The invention further provides a vehicle. The vehicle comprises a diesel engine and an exhaust system of the invention. The diesel engine is typically a conventional (i.e. traditional) diesel engine.

The diesel engine may comprise an engine management system.

The vehicle may be a light-duty diesel vehicle (LDV), such as defined in US or European legislation. A light-duty diesel vehicle typically has a weight of <2840 kg, more preferably a weight of <2610 kg.

In the US, a light-duty diesel vehicle (LDV) refers to a diesel vehicle having a gross weight of ≤8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

It is preferred that the vehicle is a heavy-duty diesel vehicle (HDV), such as a diesel vehicle having a gross weight of >8,500 pounds (US lbs), as defined in US legislation.

The diesel engine may be run on a diesel fuel comprising ≤50 ppm of sulfur, more preferably ≤15 ppm of sulfur, such as ≤10 ppm of sulfur, and even more preferably ≤5 ppm of sulfur. Such diesel fuels are often referred to as "ultra-low-sulfur diesel" (ULSD).

DEFINITIONS

The term "mixed oxide" as used herein generally refers to a mixture of oxides in a single phase, as is conventionally known in the art. The term "composite oxide" as used herein generally refers to a composition of oxides having more than one phase, as is conventionally known in the art.

For the avoidance of doubt, the term "combination of platinum (Pt) and palladium (Pd)" as used herein in relation to a region, zone or layer refers to the presence of both platinum and palladium. The word "combination" does not require that the platinum and palladium are present as a mixture or an alloy, although such a mixture or alloy is embraced by this term.

The expression "consist essentially" as used herein limits the scope of a feature to include the specified materials, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a washcoat region, a washcoat layer or a washcoat zone, means that the material in a minor amount, such as ≤5% by weight, preferably ≤2% by weight, more preferably ≤1% by weight. The expression "substantially free of" embraces the expression "does not comprise".

The expression "about" as used herein with reference to an end point of a numerical range includes the exact end point of the specified numerical range. Thus, for example, an expression defining a parameter as being up to "about 0.2" includes the parameter being up to and including 0.2.

EXAMPLES

The invention will now be illustrated by the following non-limiting examples.

Example 1

An exhaust system comprising a combination of a diesel oxidation catalyst (DOC), a selective catalytic reduction filter catalyst and an SCR catalyst having a high porosity substrate was tested as described below.

The diesel oxidation catalyst and the SCR catalyst were manufactured using conventional processes, such as described in WO 99/47260, WO 2011/080525 and WO 2014/195685. The selective catalytic reduction filter catalyst was manufactured using the method described in WO2015/145122.

The substrate of the diesel oxidation catalyst (DOC) was 10.5"×4" in size. The substrate had a cell density of 400 cpsi and a wall thickness of 7 mil. The loading of the catalyst composition was 40 g ft$^{-3}$. The catalyst composition contained Pt, Pd and $Al_2O_3$.

The substrate of the selective catalytic reduction filter catalyst was 10.5"×12" in size. The wall-flow substrate had a cell density of 300 cpsi and a wall thickness of 12 mil. The washcoat loading was 1.7 g in$^{-3}$. The catalyst composition contained a Cu zeolite having the CHA framework. The copper loading was 3.33 wt %.

The substrate of the selective catalytic reduction (SCR) catalyst was 10.5"×6" in size. The substrate had a cell density of 600 cpsi and a wall thickness of 4 mil. The washcoat loading was 4 g in$^{-3}$. The catalyst composition contained a Cu zeolite having the CHA framework. The copper loading was 3.33 wt %.

The DOC, SCR-DPF and the SCR catalyst were each hydrothermally aged (using 10% water) at 650° C. for 100 hours prior to testing the exhaust system.

Example 2

The exhaust system of Example 1, except that the diesel oxidation catalyst (DOC) was replaced with a cold start concept (dCSC™) catalyst, was tested as described below.

The substrate of the cold start concept (dCSC™) catalyst was 10.5"×6" in size. The substrate had a cell density of 400 cpsi and a wall thickness of 4 mil. The cold start concept catalyst had two layers; a bottom layer and a top layer. The bottom layer (i.e. coated directly on to the substrate) had a washcoat loading of 3 g in$^{-3}$ of the catalyst composition. The catalyst composition was a zeolite containing Pd, where the zeolite had a CHA framework. The loading of Pd was 100 g ft$^{-3}$. The top layer (coated onto the bottom layer) contained Pt (50 g ft$^{-3}$) and alumina (1.12 g in$^{-3}$). The overall ratio by weight of Pt to Pd in the catalyst was 1:2.

The cold start concept (dCSC™) catalyst, SCR-DPF and the SCR catalyst were each hydrothermally aged in the same way as Example 1.

Test Conditions

The exhaust systems of Examples 1 to 3 were each tested using a 2007 model year Cummins ISL diesel engine. The engine details are shown in Table 1. During this study, EGR was adjusted to have 4.0 g/hp-hr engine out $NO_x$. Urea was delivered and injected into the exhaust by an air assisted Grundfos pump. A six inch static mixer was placed after the injection nozzle and before the SCR-DPF in each exhaust system to ensure good mixing and uniform urea distribution in the exhaust.

TABLE 1

| | |
|---|---|
| Model | Cummins ISL |
| Emissions Standard | EPA 2007 |
| Displacement | 8.9 L |
| Type | 4-stroke |
| Power | 425 Hp |
| Config/Cylinders | Variable Geometry Turbocharger Inline 6 Cylinder |
| Controls | Electronic Control Module (ECM) |

| Certified Emission Level | |
|---|---|
| $NO_x$ (g/bhp-hr) | 1.5 |
| non-methane HC (g/bhp-hr) | 0.14 |
| particulate matter (g/bhp-hr) | 0.01 |

| $NO_x$ Emission During Test (EGR Adjusted) | |
|---|---|
| $NO_x$ (g/bhp-hr) during cold FTP | 4.0 |

The dynamometer utilized in this study was 800 HP AC motoring dyno from Horiba. Intake air flow was measured with Sierra air flow meter ranging from 0-2400 kg/hr with +/−1% accuracy in full scale. Engine out emissions were measured using Horiba MEXA 7500D dual bench (CO, HC and $NO_x$) analysers with +/−1% accuracy across the full scale. System out emissions were also measured using an FTIR (MKS model 2030 HS). SCR-DPF backpressure was monitored using pressure transducers, Setra Model 206. Temperatures in the system were measured using K type thermocouples.

Heavy duty transient cycle (FTP) testing was conducted to determine the performance of this system. Cold and hot cycles were used during different parts of the study. The average ammonia to $NO_x$ ratio (ANR) for urea dosing during transient cycles was 1.2 to 1.3.

Results $NO_x$ reduction Under Cold FTP Cycle

The overall $NO_x$ conversion for each of the exhaust systems of Examples 1 and 2 was measured during HDD cold FTP cycle with an ammonia to $NO_x$ ratio (ANR) of 1.2 to 1.3.

Before the start of the test, the system was actively regenerated to remove soot, and then the system was cooled down for 3 hours before the start of FTP cycle. Standard urea injection was used during these tests.

During cold FTP, the $NO_x$ conversion achieved with the DOC system (Example 1) was 75%. When testing the system with the cold start concept (dCSC™) catalyst (Example 2), the $NO_x$ conversion increased to 80%. This increase was due to the storage and release of $NO_x$ by the cold start concept (dCSC™) catalyst. The cold start concept (dCSC™) catalyst stored $NO_x$ in the first two hundred seconds of the cycle when the system was cold. As the system temperature increased, approximately three hundred seconds into the cycle, the stored $NO_x$ was released. At this point the SCR-DPF was warm and was capable of reducing $NO_x$. Even though there was no urea dosing during the cold section of the cycle, the $NO_x$ storage and subsequent release during the warm period enabled $NO_x$ conversion when urea dosing took place. When using a DOC in the system (Example 1), no reduction was achieved in the first two hundred seconds. Similar to the previous system (Example 2), the temperature was too low for urea dosing and hence un-stored $NO_x$ could not be converted during this section.

Figure 6:
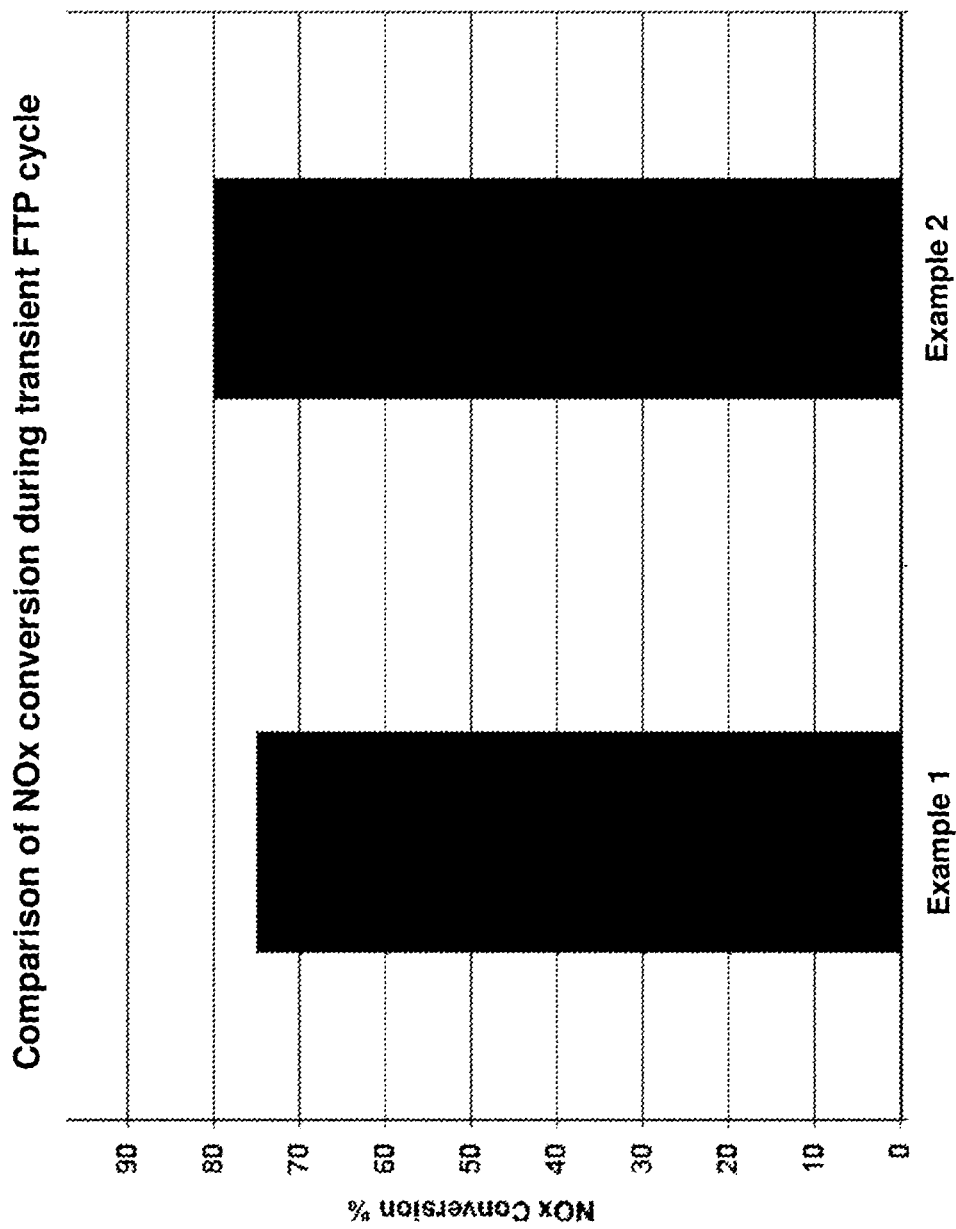
FIG. 6 is a histogram showing the % $NO_x$ conversion for Examples 1 and 2 in a heavy duty transient FTP cycle.

The results during cold FTP testing indicated that the system designed with the cold start concept (dCSC™) catalyst (Example 2) was capable of higher $NO_x$ conversion due to the storage and release capability of the cold start concept (dCSC™) catalyst. The comparison between the two systems is shown in FIG. 6. This performance demonstrated the benefit of the exhaust system comprising the cold start concept (dCSC™) catalyst for future high $NO_x$ conversion systems.

Effect of Gaseous $NH_3$ in the Cold FTP Cycle

The effect of dosing $NH_3$ gas under the cold temperature conditions of the cold FTP cycle was evaluated.

A side flow $NH_3$ doser was designed in order to generate and inject $NH_3$ gas into the main exhaust for conditions when urea could not be dosed due to very cold temperatures. The side flow $NH_3$ doser was connected to the engine pre-turbo and a small amount of hot exhaust flow (approximately 1.5 to 7.0% (e.g 15-25 kg/hr)) was pulled from the engine into the side flow system. Since flow was diverted from pre-turbo to the side flow doser, exhaust flow temperature was significantly higher than the main exhaust temperature. Urea was injected into the side flow reactor and it was converted into $NH_3$ gas over a hydrolysis catalyst. The $NH_3$ created was introduced back into the main exhaust, upstream of the mixer and the SCR-DPF.

Figure 4:
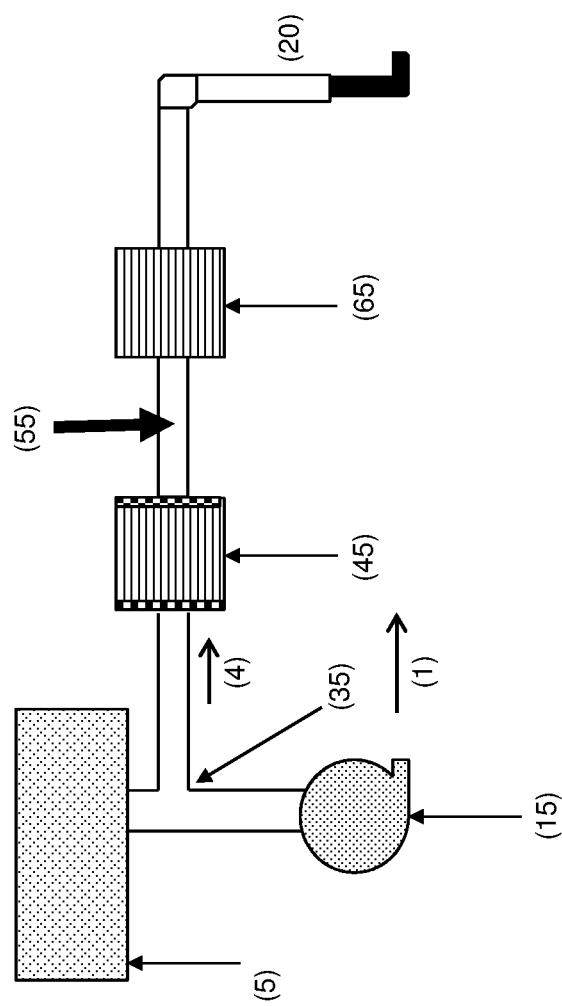

The side flow $NH_3$ doser control was used to inject $NH_3$ into the main exhaust stream from the beginning of the cold FTP cycle (i.e. when it was too cold for urea dosing), until the SCR-DPF inlet temperature reached 215° C. When the temperature was greater than 215° C., $NH_3$ dosing was stopped and the main (standard) urea dosing system was activated to inject urea into the exhaust, for the remainder of the cycle. Both system injection control strategies were set to maintain an overall an ammonia to $NO_x$ ratio (ANR) of approximately 1.2. A schematic for the arrangement is shown in FIG. 4.

For the exhaust system comprising a DOC (Example 1), $NO_x$ reduction was observed after 250 seconds. This was due to the early availability of $NH_3$ gas in the exhaust stream.

The experiment was repeated using the exhaust system comprising a cold start concept (dCSC™) catalyst (Example 2). The cold start concept (dCSC™) catalyst stored $NO_x$ through the first 200 seconds. As the catalyst temperature warmed up, $NO_x$ was released. Since there was $NH_3$ available at the beginning of the cycle, more $NO_x$ was converted on the SCR-DPF as compared to the exhaust system of Example 2 when $NO_x$ reduction was performed under cold FTP cycle without the addition of $NH_3$ using the side flow $NH_3$ doser.

When $NH_3$ was added using the side flow $NH_3$ doser during the cold FTP cycle, $NO_x$ conversion for the exhaust system containing the DOC (Example 1) increased to 80% from the baseline. For the exhaust system comprising the cold start concept (dCSC™) catalyst (Example 2), $NO_x$ conversion increased to 83%. This test indicated that the presence of $NH_3$ in the early stages of the cycle can provide a further increase in $NO_x$ conversion.

Effect of Pre-Stored $NH_3$ in the Cold FTP Cycle

The impact of pre-stored $NH_3$ along with standard urea dosing was evaluated under the cold FTP cycle. The system was pre-saturated with ammonia prior to FTP testing, in order to simulate early and sufficient availability of gaseous $NH_3$. The pre-saturation testing was conducted during the preparation cycle before the start of cold FTP. The pre-saturation was carried out by running several hot FTP cycles with an ANR of approximately 1.2 to 1.3 until the SCR-DPF and SCR catalyst were considered to be saturated with $NH_3$. After system saturation, the engine was shut down and the system was cooled down for 3 hours. After cool down, one cold FTP test was carried out with the system along with normal urea dosing. $NH_3$ dosing from the side reactor was not utilized during this time.

As before, the exhaust temperature was cold and no urea was injected for the majority of the first half of the cycle. For the exhaust system of Example 1 (DOC), the average temperature was approximately 245° C. However, the $NO_x$ reduction started at 100 seconds when there was a temperature increase. The majority of $NO_x$ conversation started around 230 seconds into the cycle. This was due to the presence of pre-saturated $NH_3$ in the system (SCR-DPF and SCR catalyst).

For the exhaust system of Example 2 (cold start concept (dCSC™) catalyst), $NO_x$ is stored at the beginning of the cycle and since pre-stored $NH_3$ is available, the SCR-DPF is capable of reducing $NO_x$ further in the first 150 seconds. As $NO_x$ is released around 250 seconds into the cycle, the SCR-DPF is capable of reducing all the $NO_x$ due to pre-stored $NH_3$.

During cold FTP, $NO_x$ conversion was increased to 88% for the DOC containing system (Example 1) and to at least 91% for the cold start concept (dCSC™) catalyst containing system (Example 2) using the pre-saturation $NH_3$ strategy. This test indicated that much higher $NO_x$ conversion is possible during the cold FTP cycle if sufficient $NH_3$ is present from the early stages of the cycle.

Effect of Pre-Stored $NH_3$ and Thermal Management in the Cold FTP Cycle

Figure 5:
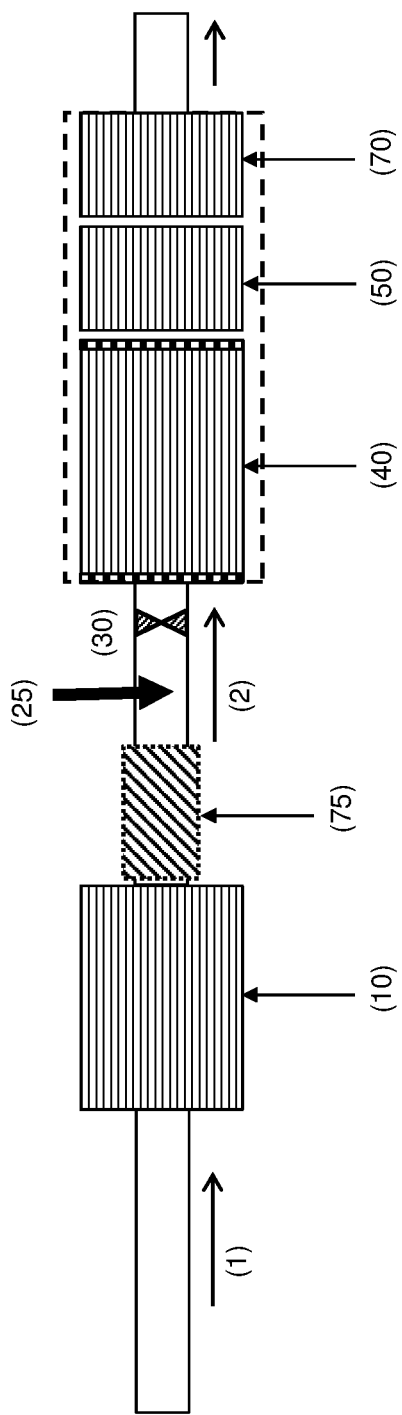

An electrical heater was installed after either the DOC (Example 1) or the cold start concept (dCSC™) catalyst (Example 2) and before urea injection and the SCR-DPF (see FIG. 5).

To pre-store $NH_3$, five back to back FTP cycles with urea injection of ANR 1.2-1.3 were run to pre-treat each system. The system was cooled for three hours before running the cold FTP cycle. The same ANR of 1.2-1.3 was used during this cycle to determine the system $NO_x$ reduction capability.

The electrical heater was used to warm up the exhaust in the first 400 seconds (i.e. cold section) of the cold FTP cycle. The maximum power for the heater was 20 KW. The electrical heater was turned off 400 seconds into the cycle. This test was to simulate a condition with pre-saturation of $NH_3$ as well as the presence of thermal management to enable early $NH_3$—$NO_x$ reaction. The presence of thermal management also enabled early dosing of urea.

By turning on the electrical heater, the exhaust temperature was ramped up quickly and reached 200° C. two hundred seconds into the cycle. The average temperature was approximately 270° C. As $NH_3$ was pre-stored in the SCR-DPF and SCR catalyst, sufficient reductant was available from the beginning of the cycle. There was no urea dosing while the temperature was below 200° C. Urea dosing was enabled from 200 seconds into the cycle as the SCR catalyst temperature reached 200° C.

For the exhaust system containing a DOC (Example 1), this enabled a $NO_x$ reduction of 94%. $NO_x$ reduction started from 80 seconds into the cycle due to the higher temperature. There were almost no $NO_x$ emission peaks after 100 seconds into the cycle.

For the exhaust system containing the cold start concept (dCSC™) catalyst (Example 2), the cold start concept (dCSC™) catalyst was capable of storing a significant amount of $NO_x$ at the start of the cycle through the first 100 seconds. After 100 seconds, with temperature increasing, the cold start concept (dCSC™) catalyst started releasing some $NO_x$ with most coming out after 250 seconds. Meanwhile, with the heater, the inlet temperature of the SCR-DPF reached 200° C. around 100 seconds in the cycle, which enabled $NO_x$ reduction across the SCR-DPF and SCR catalyst. This was also supported by the stored $NH_3$ available. As a result, there was no $NO_x$ breakthrough in the tailpipe after the first 100 seconds and all $NO_x$ was converted. This resulted in a $NO_x$ conversion of 98% for Example 2, the exhaust system containing the cold start concept (dCSC™) catalyst.

The results from the above tests are shown in Table 2, which compare the $NO_x$ conversion of the exhaust system containing the cold start concept (dCSC™) catalyst (Example 2) with the exhaust system containing the DOC (Example 1) for all the options tested under cold FTP. The results with the cold start concept (dCSC™) catalyst always exhibited higher system $NO_x$ reduction compared to the DOC containing system, demonstrating the benefits of the cold start concept (dCSC™) catalyst.

TABLE 2

| | Average Temp (° C.) | $NO_x$ Conversion (%) Example 1 | Example 2 |
|---|---|---|---|
| Baseline | 245 | 75 | 80 |
| Gaseous $NH_3$ + urea dosing | 245 | 80 | 83 |
| Pre-stored $NH_3$ + urea dosing | 245 | 88 | 91 |
| Pre-stored $NH_3$ + thermal management + urea dosing | 270 | 94 | 98 |

Example 3

The exhaust system of Example 2 was modified by changing the catalyst composition of the SCR-DPF from Cu zeolite to a vanadium containing catalyst. The wall-flow substrate that was used was the same as the wall-flow substrate that was used for the selective catalytic reduction filter catalyst of Example 1.

The catalyst composition of the SCR-DPF contained a vanadium-tungsten-titania catalyst, where the loading of vanadium was 24 g ft$^{-3}$, the loading of tungsten was 303 g ft$^{-3}$ and the loading of titania 1.12 g in$^{-3}$. The catalyst composition also contained an iron exchanged zeolite, where the zeolite had the MFI framework. The loading of Fe was 10 g ft$^{-3}$ and the loading of the zeolite was 0.16 g in$^{-3}$.

The cold start concept (dCSC™) catalyst was identical to the cold start concept catalyst used in Example 2. The SCR catalyst was identical to the SCR catalyst that was used in Example 1.

The cold start concept (dCSC™) catalyst, SCR-DPF and the SCR catalyst were each hydrothermally aged in the same way as Example 1.

The exhaust system of Example 3 was tested using the same method and conditions that were used for Examples 1 and 2 to assess the effect of pre-stored $NH_3$ and the effect of pre-stored $NH_3$ and thermal management in the cold FTP cycle. The exhaust system of Example 2 was re-tested to provide a comparison. The amount of $N_2O$ that was emitted by the exhaust systems of Examples 2 and 3 was also determined. The results are shown in Table 3.

TABLE 3

| | $NO_x$ Conversion (%) | | $N_2O$ (g/hp-hr) | |
|---|---|---|---|---|
| | Example 2 | Example 3 | Example 2 | Example 3 |
| Pre-stored $NH_3$ + urea dosing | 91 | 92 | 0.13 | 0.04 |
| Pre-stored $NH_3$ + thermal management + urea dosing | 98 | 997 | 0.15 | 0.06 |

The exhaust system of Example 3 shows comparable $NO_x$ conversion to the exhaust system of Example 2. However, the amount of $N_2O$ that was emitted by the exhaust system of Example 3 was significantly lower that the amount of $N_2O$ that was emitted by the exhaust system of Example 2.

Experiments have also shown that the emission obtained from an exhaust system where the Cu-zeolite based SCR catalyst in Example 3 has been replaced with an extruded vanadium based SCR catalyst can emit a lower amount of $N_2O$ compared to the exhaust system of Example 3 while also providing comparable $NO_x$ conversion.

For the avoidance of any doubt, the entire content of any and all documents cited herein is incorporated by reference into the present application.

The invention claimed is:

1. An exhaust system for treating an exhaust gas produced by a diesel engine comprising:
   (a) an emissions control device for oxidizing at least one of carbon monoxide (CO) and hydrocarbons (HCs) having an inlet and an outlet, wherein the emissions control device comprises a platinum group metal (PGM) and a substrate, wherein the platinum group metal (PGM) is selected from platinum (Pt), palladium (Pd) and a combination thereof;
   (b) an injector for introducing an ammonia precursor into the exhaust gas, which is downstream of the emissions control device for oxidizing at least one of carbon monoxide (CO) and hydrocarbons (HCs);
   (c) a first selective catalytic reduction catalyst downstream of the injector for introducing an ammonia precursor into the exhaust gas, wherein the first selective catalytic reduction catalyst comprises a substrate and a first selective catalytic reduction composition, wherein the substrate is either a flow-through substrate or a filtering substrate;
(d) a second selective catalytic reduction catalyst downstream of the first selective catalytic reduction catalyst, wherein the second selective catalytic reduction catalyst comprises a flow-through substrate and a second selective catalytic reduction (SCR) composition; and
(e) an electrically heatable conduit between the emissions control device and the first selective catalytic reduction catalyst wherein the electrically heatable conduit is positioned between the emissions control device and the injector for introducing an ammonia precursor into the exhaust gas;
(f) a gaseous ammonia doser for introducing gaseous ammonia into the exhaust gas, wherein the gaseous ammonia doser is disposed downstream of the emissions control device for oxidizing at least one of carbon monoxide (CO) and hydrocarbons (HCs) and upstream of the first selective catalytic reduction catalyst;
(g) an electrically heatable conduit is directly coupled to the outlet of between the emissions control device for oxidising at least one of carbon monoxide (CO) and hydrocarbons (HCs), and the first selective catalytic reduction catalyst; wherein
the emissions control device, the electrically heatable conduit the first selective catalytic reduction catalyst, and the second selective catalytic reduction catalyst are positioned in fluid communication with one another;
at least one of the emissions control device and the first selective catalytic reduction catalyst has a filtering substrate;
the gaseous ammonia doser comprises:
(i) an injector for introducing an ammonia precursor into a secondary exhaust gas conduit; and
(ii) a hydrolysis catalyst for converting the ammonia precursor into gaseous ammonia; wherein the injector for introducing an ammonia precursor into a secondary exhaust gas conduit is upstream of the hydrolysis catalyst; and
the secondary exhaust gas conduit is coupled to an exhaust manifold of the diesel engine upstream of a turbocharger.

2. The exhaust system of claim 1, wherein the electrically heatable conduit is directly coupled to the outlet of the emissions control device.

3. The exhaust system of claim 2, wherein the electrically heatable conduit is part of an exhaust gas conduit between an outlet of the emissions control device for oxidizing at least one of carbon monoxide (CO) and hydrocarbons (HCs) and an inlet of the first selective catalytic reduction catalyst.

4. The exhaust system of claim 1, where the emissions control device for oxidizing carbon monoxide (CO) and/or hydrocarbons (HCs) may be selected from the group consisting of (i) a diesel oxidation catalyst (DOC), (ii) a catalyzed soot filter (CSF), (iii) a cold start concept catalyst; (iv) a diesel oxidation catalyst (DOC) and a catalyzed soot filter (CSF); and (v) a cold start concept catalyst and a catalyzed soot filter (CSF).

5. The exhaust system of claim 1, wherein the emissions control device for oxidizing at least one of carbon monoxide (CO) and hydrocarbons (HCs) comprises a cold start concept catalyst, wherein the cold start concept catalyst comprises a catalytic material supported on a substrate, wherein the catalytic material comprises a molecular sieve catalyst comprising a noble metal and a molecular sieve.

6. The exhaust system of claim 5, wherein the noble metal comprises palladium.

7. The exhaust system of claim 5, wherein the molecular sieve is selected from a small pore molecular sieve, a medium pore molecular sieve and a large pore molecular sieve.

8. The exhaust system of claim 7, wherein the molecular sieve is a small pore molecular sieve having a framework structure with an Framework Type Code (FTC represented by AEI or CHA.

9. The exhaust system of claim 1, wherein (b) the injector is a liquid injector for introducing a solution comprising an ammonia precursor into the exhaust gas.

10. The exhaust system of claim 1, wherein the first selective catalytic reduction composition comprises a metal oxide based SCR catalyst formulation, a molecular sieve based SCR catalyst formulation or a mixture thereof.

11. The exhaust system of claim 10, wherein the first selective catalytic reduction composition comprises a metal oxide based SCR catalyst formulation, which comprises vanadium or tungsten or a mixture thereof supported on a refractory oxide.

12. The exhaust system of claim 10, wherein the first selective catalytic reduction composition comprises a molecular sieve based SCR catalyst formulation, which comprises a transition metal exchanged molecular sieve.

13. The exhaust system of claim 10, wherein the metal oxide based SCR catalyst formulation comprises an oxide of vanadium and optionally an oxide of tungsten, supported on titania, and (b) the molecular sieve based SCR catalyst formulation comprises a transition metal exchanged molecular sieve, wherein the transition metal of the transition metal exchanged molecular sieve is iron.

14. The exhaust system of claim 1, wherein the (d) selective catalytic reduction (SCR) catalyst has a flow-through substrate, which is a flow-through monolith, wherein the uncoated flow-through monolith has a porosity of 45 to 60%.

15. The exhaust system of claim 1, wherein the second selective catalytic reduction composition comprises a metal oxide based SCR catalyst formulation, a molecular sieve based SCR catalyst formulation or a mixture thereof.

16. The exhaust system of claim 15, wherein the second selective catalytic reduction composition comprises a metal oxide based SCR catalyst formulation, which comprises vanadium or tungsten or a mixture thereof supported on a refractory oxide.

17. The exhaust system of claim 15, wherein the second selective catalytic reduction composition comprises a molecular sieve based SCR catalyst formulation, which comprises a transition metal exchanged molecular sieve.

* * * * *